US006712534B2

(12) United States Patent
Patel

(10) Patent No.: US 6,712,534 B2
(45) Date of Patent: Mar. 30, 2004

(54) ERGONOMIC AND EFFICIENT KEYBOARD

(76) Inventor: Sanjay M. Patel, 53 Dovercourt Avenue, Thornton Heath, Surrey CR7 7LJ (GB)

( * ) Notice: Subject to any disclaimer, the term of this patent is extended or adjusted under 35 U.S.C. 154(b) by 16 days.

(21) Appl. No.: 10/096,853

(22) Filed: Mar. 14, 2002

(65) Prior Publication Data

US 2003/0016985 A1 Jan. 23, 2003

Related U.S. Application Data

(60) Provisional application No. 60/306,868, filed on Jul. 23, 2001.

(51) Int. Cl.[7] .................................................. B41J 5/08
(52) U.S. Cl. ........................ 400/486; 400/489; 341/72; 345/168
(58) Field of Search ................. 400/472, 480, 400/486, 489; 345/168; 341/22

(56) References Cited

U.S. PATENT DOCUMENTS

| 3,226,712 | A | * | 12/1965 | Lens et al. ...................... 341/22 |
| 3,929,216 | A | * | 12/1975 | Einbinder ...................... 400/484 |
| 3,940,758 | A | * | 2/1976 | Margolin ...................... 345/169 |
| 4,824,268 | A | | 4/1989 | Diernisse |
| 5,017,030 | A | | 5/1991 | Crews |
| 5,073,050 | A | | 12/1991 | Andrews |
| 5,122,786 | A | | 6/1992 | Rader |
| 5,137,384 | A | | 8/1992 | Spencer et al. |
| 5,178,477 | A | | 1/1993 | Gambaro |
| 5,187,644 | A | * | 2/1993 | Crisan ...................... 361/680 |
| 5,318,367 | A | | 6/1994 | Braun et al. |
| 5,332,322 | A | | 7/1994 | Gambaro |
| 5,360,280 | A | | 11/1994 | Camacho et al. |
| 5,372,441 | A | | 12/1994 | Louis |
| 5,397,189 | A | | 3/1995 | Minogue |
| 5,426,449 | A | | 6/1995 | Danziger |

(List continued on next page.)

FOREIGN PATENT DOCUMENTS

| DE | 3 409 980 | 9/1985 |
| DE | 43 04 470 | 8/1994 |
| EP | 0 768 598 | 4/1997 |
| EP | 0 810 513 | 12/1997 |
| FR | 2 655 911 | 6/1991 |
| WO | WO 01/27732 | 4/2001 |

Primary Examiner—Stephen R. Funk
Assistant Examiner—Dave A. Ghatt
(74) Attorney, Agent, or Firm—Richard C. Litman

(57) ABSTRACT

An ergonomic computer keyboard which integrates conventional keyboard features to form a Multi-Dexterous Keyboard (MDK) system designed to minimize Repetitive Stress Injuries. Specific emphasis is placed on the general and simultaneous utilization by either a single or dual handed, full or limited dexterity, and right and left oriented keyboard user. The ergonomic computer keyboard system is described as a solid and/or split contoured keyboard with centralized composite keys disposed thereon to reduce finger reach within one-hand span. Language characteristics are statistically extrapolated and arranged based on the most used letters or groups of letters in the form of digraphs (coupled letters) and trigraphs (tripled letters, etc.) for efficient utilization of the keyboard via either a dual or single handed user. A special partition of the keyboard provides numerous ergonomic arrangements with simultaneous use as either a Left-Hand-Side (LHS) or Right-Hand-Side computer keyboard module.

8 Claims, 19 Drawing Sheets

U.S. PATENT DOCUMENTS

| | | |
|---|---|---|
| 5,503,484 A | 4/1996 | Louis |
| 5,553,953 A | 9/1996 | Herman et al. |
| 5,610,602 A | 3/1997 | Hargreaves |
| 5,612,691 A | 3/1997 | Mumann et al. |
| 5,620,267 A | 4/1997 | Klauber |
| 5,660,488 A | 8/1997 | Miller |
| 5,673,040 A | 9/1997 | Hargreaves et al. |
| 5,689,253 A | 11/1997 | Hargreaves et al. |
| 5,716,149 A | 2/1998 | Mensick |
| 5,731,808 A | 3/1998 | Gaither |
| 5,788,195 A | 8/1998 | Rice |
| 5,788,386 A | 8/1998 | Hayashi et al. |
| 5,790,103 A | 8/1998 | Willner |
| 5,828,323 A | 10/1998 | Bartet |
| 5,971,636 A | 10/1999 | Mensick |
| 6,005,496 A | 12/1999 | Hargreaves et al. |
| 6,011,495 A * | 1/2000 | Chen .......................... 341/22 |
| 6,022,156 A | 2/2000 | Blish |
| 6,031,469 A | 2/2000 | Dodd |
| 6,084,576 A | 7/2000 | Leu et al. |
| 6,088,022 A | 7/2000 | Rakoski |
| 6,132,118 A | 10/2000 | Grezeszak |
| 6,147,673 A | 11/2000 | Zarek |
| 6,198,474 B1 * | 3/2001 | Roylance .................... 345/168 |
| 6,224,279 B1 | 5/2001 | Nielsen et al. |

* cited by examiner

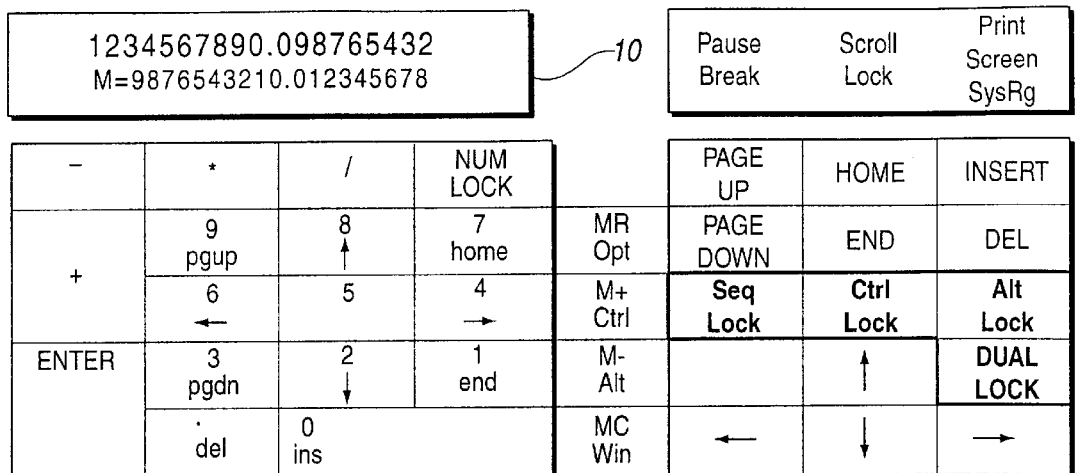
Fig. 3A
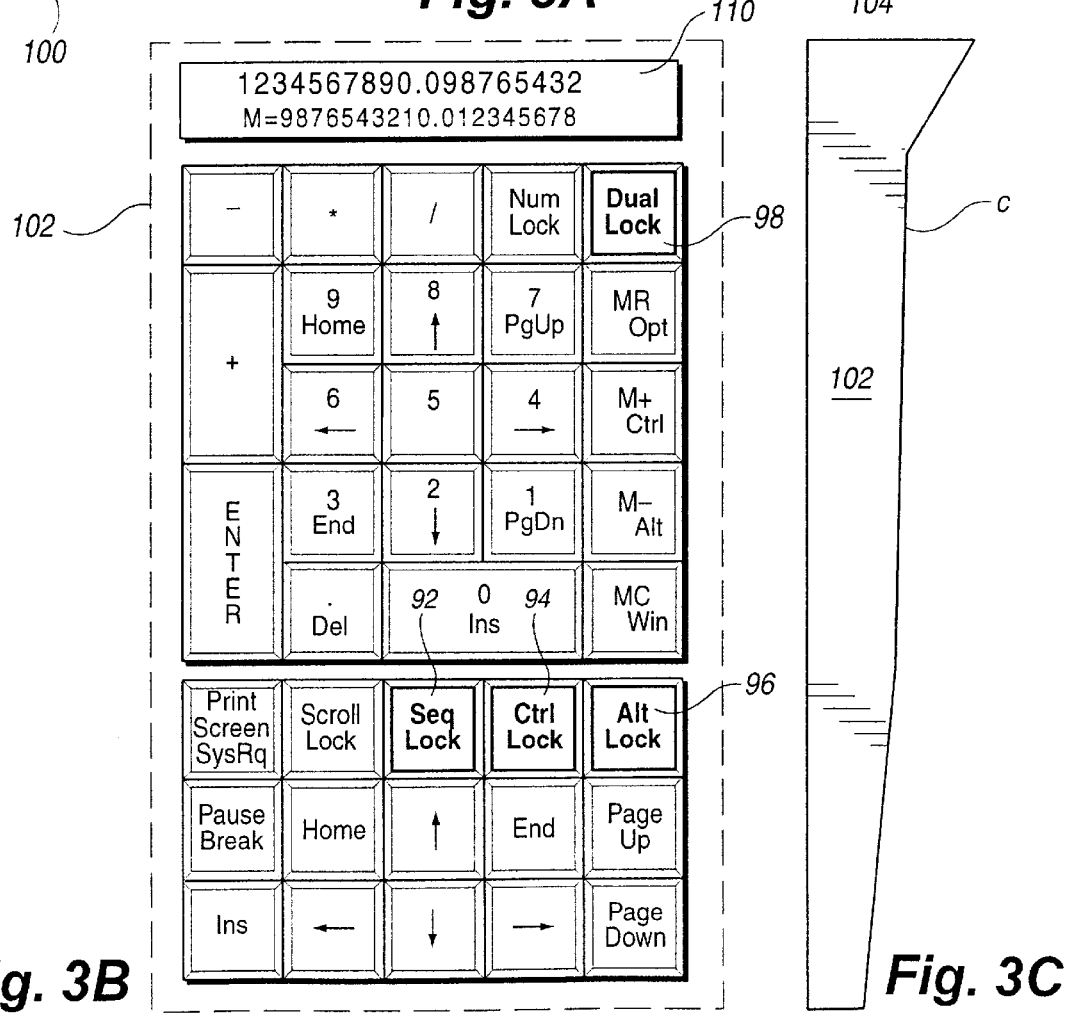
Fig. 3B
Fig. 3C

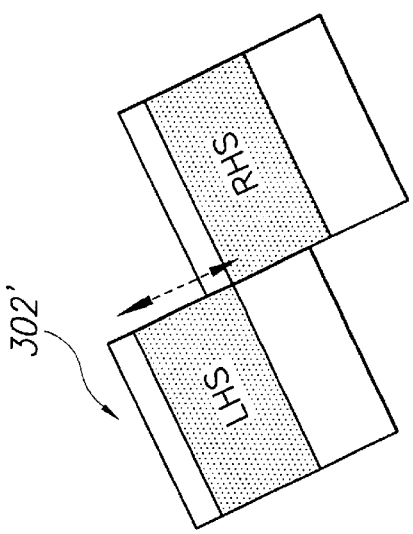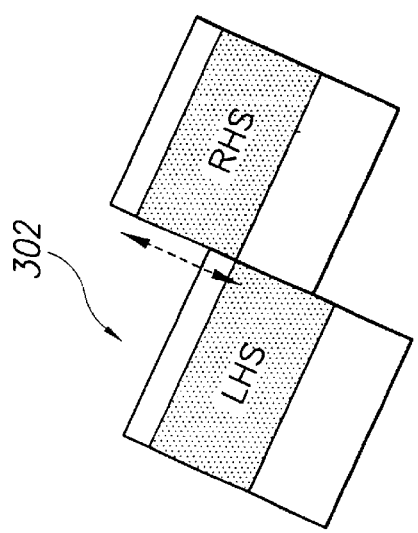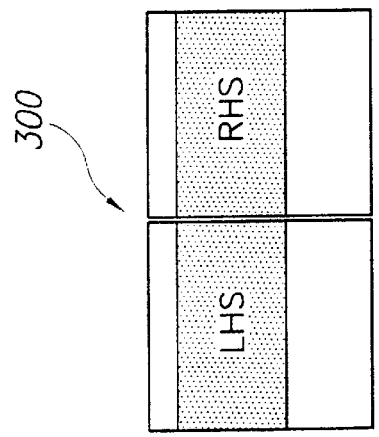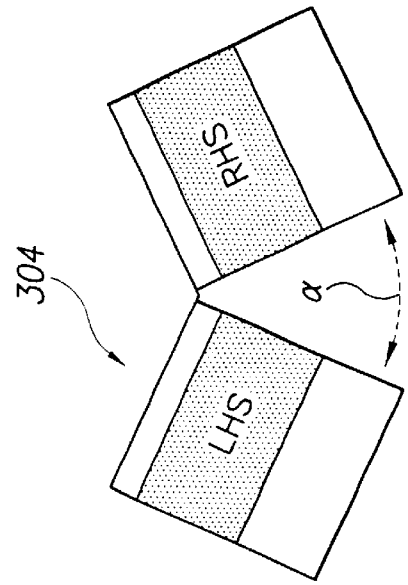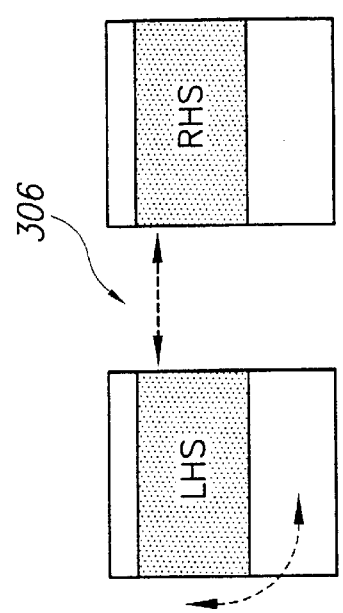
Fig. 5C
Fig. 5D
Fig. 5E
Fig. 5F
Fig. 5G

Fig 8A

| | Normal Mode | | | Caps Lock Mode | | |
|---|---|---|---|---|---|---|
| | Letter Key (t,T) | Symbol Key (3,#) | Feature Key (to,TO,www) | Letter Key (T,t) | Symbol Key (3,#) | Feature Key (TO,to,WW) |
| Normal | t | 3 | to | T | 3 | TO |
| Shift | T | # | TO | t | # | to |
| Dual | T | # | www | t | # | WWW |
| Dual Shift | T | # | WWW | t | # | www |

Fig 8B

| | Normal Mode | | | Caps Lock Mode | | |
|---|---|---|---|---|---|---|
| | Letter Key (t,T,the) | Letter Key (qu,QU,q) | Feature Key (to,TO,www) | Letter Key (T,t,THE) | Letter Key (QU,qu,Q) | Feature Key (TO,to,WW) |
| Normal Mode | t | qu | to | T | QU | TO |
| Shift | T | QU | TO | t | qu | to |
| Dual | the | q | www | THE | Q | WWW |
| Dual Shift | THE | Q | WWW | the | q | www |

ERGONOMIC AND EFFICIENT KEYBOARD

CROSS-REFERENCE TO RELATED APPLICATION

This application claims the benefit of U.S. Provisional Patent Application Ser. No. 60/306,868, filed Jul. 23, 2001.

BACKGROUND OF THE INVENTION

1. Field of the Invention

The present invention relates generally to keyboards. More specifically, the invention is an integrated ergonomic keyboard which utilizes a plurality of keys having statistically extrapolated indicia disposed thereon, in the form of characters, words and special commands for a specific language or software application use to form a Multi-Dexterous Keyboard (MDK) system, which significantly improves efficiency through reduced key stroke activity, increases comfort through various dexterity approaches and thus effectively reduces Repetitive Stress Injuries (RSI) in applications and their use thereof.

2. Description of the Related Art

The industry standard keyboard layout that possesses a virtually complete monopoly in computers today is referred to as the QWERTY keyboard, because of the arrangement of the keys in the upper row of "conventional keyboards". Unlike the original keyboard layout designed by Sholes in the late 1800's as a two finger typing layout (and the ten finger layout attributed to Mrs. L. V. Longley in 1878), the QWERTY layout was designed primarily to maximize the separation of the most frequently used keys in order to reduce jamming of the typewriter mechanism. As a result of this arrangement, the keys that were most frequently used were not as easily accessible by the typist. Thus, the QWERTY layout effectively reduced the speed at which user's accessed keys.

Other keyboard layouts such as the Dvorak and Maltron models are available alternatives to the QWERTY keyboard. The most notable layout among these alternatives in the United States is the Dvorak layout named for its inventor, August Dvorak who was an early Ergonomics researcher at the University of Washington. In 1936, he analyzed the English language to determine which letters were most frequently used. He then rearranged the keyboard layout so that the keys having the most used letter indicia found were positioned on the "home row", that is the row under the fingers of a typist defined as a rest position. By grouping the keys with the most used letter indicia close together, finger reaching distance between the most used "letter" keys was minimized and typing speed increased. The Maltron keyboard layout capitalizes on the natural finger movements and the differing lengths of the fingers and thumbs. In 1976, Lillian Malt developed the idea of curving the keyboard to fit the natural finger movements thereby relieving fatigue and pain in the associated muscle groups. The keyboard layout is shaped in three dimensions, and allows movements to occur naturally to minimize muscle related fatigue and stress. Separation of the letter keys into two spaced groups and designing for radial finger movement over keys at differing heights, the Maltron layout sought to reduce abduction and pronation stress. However, this model has been plagued by the psychological effects of having a trained typist relearn or adjust to a new keyboard orientation. Thus, the Maltron model has fared only in Europe.

In the United States, however, conformance to the format and shape of the computer keyboard has only grown from the QWERTY concept that was originally designed for typewriters to permit in its infancy rather sluggish mechanics to operate efficiently and effectively. The practice of heavy key presses also only allowed for and targeted the non-disabled users.

The demand for rapid data entry into computers and the increase in complex combinations of keystrokes required by modern software applications, have been the driving factors for the need of an ergonomic keyboard which maximizes user comfort and provides a keyboard layout for the efficient utilization of the most frequently used characters, words and related function keys in a keyboard system to minimize the growing number of reported Repetitive Stress/Strain Injuries (RSI) for both disabled and non-disabled keyboard users.

While numerous ergonomic keyboards have been devised to provide user comfort and utility, particularly in three categories: key positioning and utilization, single handed and separate manipulable keyboard consoles, and special ergonomic contours for hand and finger placement, there has yet to exist an ergonomic keyboard which utilizes a keyboard layout with keys having selective indicia of the most used characters, words and/or commands statistically extrapolated from a language (eg. English, German, etc.) and from software application use for efficient keyboard use and the reduction of RSI as herein described.

In the first category, U.S. Pat. No. 4,824,268 issued to Diernisse H. V. discloses an ergonomic keyboard which groups information into specific modes such as the capital letters of the Latin alphabet and other information which can be entered by a single key stroke. The keys on the keyboard are irregularly arranged so that the fingers naturally rest on a set of home keys (eg. Y, U, B, P, D and H). In the preferred arrangement, the keys are separated by an imaginary dividing line down the middle of the board with each side having two groups of keys separated from each other.

The top groups are information keys, operated by the non-thumbs as preprogrammed or operator programmed keys. The top group of keys transmit bits of information consisting of characters, operations or sequences thereof. The bottom groups are control keys which control hardware and software operated by the thumbs. With the exception of the programmable function, the bottom groups perform the same function in all modes on a particular device, and are permanently marked with the functions they perform. Similarly designed keyboards are disclosed in U.S. Pat. Nos. issued to Crews (5,017,030), Braun et al. (5,318,367), Louis (5,372,441 and 5,503,484), Miller (5,660,488) and Willner (5,790,103).

U.S. Pat. No. 5,017,030 issued to Crews discloses a split designed ergonomic keyboard as a single keyboard console usable on a typewriter or computer terminal which includes right and left pre-loaded palm pads. Each palm pad respectively supports the left and right hand and serve to operate the SHIFT and SHIFT LOCK functions. A dual column of function keys are disposed within a central portion of the keyboard separating the left and right hand keys as preprogrammed function keys. The keys are arranged to fit the span of a single hand with multiple character output.

The keyboard design which utilizes the split or V-shaped arrangement of the keys has provided added utility amongst conventional keyboards according to the "Qwerty" geometric keyboard standard. However, this key arrangement was not intended to provided optimal character output targeted towards reducing Repetitive Stress Injuries (RSI). This particular keyboard arrangement is disclosed in the respective Patents issued to Braun et al. (U.S. Pat. No. 5,318,367), Louis (U.S. Pat. Nos. 5,372,441 and 5,503,484), Miller (U.S. Pat. No. 5,660,488) Hossenlopp et al. (WO 01/27732 A1).

U.S. Pat. No. 5,620.267 issued to Klauber discloses a keyboard with thumb activated control keys. The placement of the thumb activated keys facilitates easy ergonomic access to control functions without averting the eyes from executed readable text or preventing uncomfortable stretching of the hands. This particular key feature is incorporated herein by reference. Other varieties of conventional keyboards with special key placements for efficient utilization of selective keys are described in U.S. Pat. Nos. issued to Mensick (5,716,149 and 5,971,636), Willner (5,790,103), Bartet (5,828,323), Hargreaves et al. (6,005,496), Dodd (6,031,469), Leu et al. (6,084,576) and Rakoski (6,088,022).

U.S. Pat. Nos. issued to Mensick (5,716,149 and 5,971,636) discloses a keyboard which integrates the placement of keys within a single conventional keyboard having a spaced sinusoidal pattern instead of a linear arrangement. The geometric relationships between keys is selected to correspond to the relative positions of the base of a user's fingers, wrist and natural orientation of the finger tips. This correspondence correlates the organization of keys with arrangements of the metacarphalangeal joints forming the base of the fingers. In particular, these ergonomic modifications are applied to the standard geometry of the "QWERTY" or DVORAK keyboard.

U.S. Pat. No. 5,790,103 issued to Willner discloses another approach of key placements for a single conventional keyboard. The keyboard system includes a base on which is provided a first set of control keys for assigning an output function selected by simultaneously operating one of a plurality of multi-function character keys. The particular assignment of alphabetic characters to particular character keys is made to provide "QWERTY" compatibility. Each of the sets of the keys are irregularly arranged on the base to be located under the fingertips of a user's bent hands. Special function keys are separated by color coded indicia to indicate upper and lower case letters for example, via CAPS SHIFT and CAPS LOCK control keys.

U.S. Pat. No. 5,828,323 issued to Bartet discloses an ergonomic keyboard which utilizes ten keys activated in pairs to produce coding signals in the form of alphabetical symbols. The keyboard operates as a replacement or in parallel with a conventional keyboard. Each key corresponds in position with each finger on a hand. By pressing two keys, unique letters and functions are produced.

U.S. Pat. No. 6,005,496 issued to Hargreaves et al. discloses an ergonomic keyboard which includes an alphanumeric key array arranged in a generally orthogonal, concave array. A home row of keys defines a reference position for the fingers of the operator or user. A linear array of function keys is provided and positioned above the reference position and tilted toward the user. A generally orthogonal array of auxiliary keys is also disposed above the reference and is rotated with respect to the reference position to accommodate the natural angle of the thumb and index finger of respective left and right hands of the operator.

U.S. Pat. No. 6,031,469 issued to Dodd discloses a pyramidal-shaped keyboard device which includes left and right hand members separated from each other by a thumb control surface. Each hand member is formed with four cavities for receiving the four fingers of the left and right hands, respectively of a user. Each cavity contains three switches, with one switch being operated when the user extends the appropriate finger, a second being operated when the user depresses the finger, and a third being operated when the user retracts the finger. Each switch generates a signal representative of a character of a character set with thumb switches being operable by a user's thumbs to invoke one of a plurality of sets. A similar pyramidal-shaped keyboard is disclosed in the U.S. Pat. No. issued to Danziger (5,426,449).

Numerous other conventional ergonomic keyboards such as those disclosed in the U.S. Pat. Nos. issued to Hargreaves (5,610,602), Rader (5,122,786), Spencer et al. (5,137,384), Gambaro (5,178,477 and 5,332,322), Hargreaves et al. (5,673,040), Grezesak (6,132,118) and Leu et al (6,084,576) are designed specifically with key features for single, left and right hand operability. Of particular note, is the U.S. Pat. No. 6,084,576 issued to Leu et al. which describes an ergonomic keyboard having keys mapped to the shape or contour of the hands and fingers of a user.

U.S. Pat. No. 6,088,022 issued to Rakoski discloses a spherical keyboard having cavities in its outer surface for adapting keys thereto and a built-in mouse. The cavities are arranged in arcuate rows, with the rows corresponding to the positions and varied lengths of a users's fingers. Keys are arranged in the cavities in a standard keyboard or QWERTY format so that users with conventional typing skills can use normal fingering for data entry without lifting their hands from the spherical body.

U.S. Pat. No. 6,147,673 issued to Zarek discloses a keyboard also having an embedded mouse feature, however, the mouse is disposed as a removable feature within a split keyboard arrangement having keys set integrally within a substantially planar base. Other split style keyboards are disclosed in U.S. Pat. Nos. issued to Gaither (5,731,808), Cheng (5,775,822), Hayahi et al. (5,788,386) and Blish (6,022,156), which include multiple keyboard sections linked by at least one data transmission cable.

With split keyboard designs come various ergonomic contours and shapes in keyboards for added comfort with special hand placement as those keyboards or data entry devices described in the U.S. Pat. Nos. issued to Andrews (5,073,050), Camacho et al. (5,360,280), Minogue (5,397, 189), Herman et al. (5,553,953), Murmann et al. (5,553, 953), Murmann et al. (5,612,691), Rice (5,788,195) and Nielsen et al. (U.S. Pat. No. 6,224,279).

Foreign Patents granted to Anmelder (DE 43 04 470 A1), Byrne (EP 0 768 598 A1), Paul (DE 34 09 980 A1), Montane (FR 2 655 911), and Jan (DE 4 304 470) disclose conventional ergonomic keyboard features of general relevancy to the ergonomic keyboard system as herein described.

None of the above inventions and patents, taken either singly or in combination, is seen to describe the instant invention as claimed.

SUMMARY OF THE INVENTION

The computer keyboard according to the invention is an integrated ergonomic keyboard which combines conventional keyboard features to form a Multi-Dexterous Keyboard (MDK) system using statistically extrapolated characters, groups of words and/or special commands disposed on selective keys for efficient and less repetitive key use noted for currently available keyboards. The MDK features are designed to minimize Repetitive Stress Injuries (RSI), Carpel Tunnel Syndrome (CTS) and other Cummulative Trauma Disorders (CTD) such as Musculoskeletal Disorders (MSD), Occupational Overuse Syndrome (OOS), Repetitive Motion Injury (RMI), Upper Limb Disorder (ULD), etc. general utilization by both dual or single handed keyboard users, full or limited dexterity keyboard users, and left or right hand oriented keyboard users.

In a first embodiment, described as a solid and/or contoured split keyboard structure with feature keys disposed centrally, thus retaining somewhat a similar look and feel of a standard keyboard, also comprises subtle width separation between the Left-Hand-Side (LHS) and Right-Hand-Side (RHS) of a standard keyboard, thus reducing ulnar deviation and pronation issues similar to those attempted by keyboards with the "V" orientation. Language characteristics in English (and other languages) are statistically extrapolated and arranged as primary key values based on the most used letters or groups of letters (i.e. in the form of digraphs (coupled letters), tri-graphs (tripled letters, etc.) or words for efficient utilization of the keyboard via either a dual or single handed user. Also, as secondary values to the extrapolated language based primary key values, as described prior, the most common application commands, acronyms and/or mnemonics are statistically extrapolated and arranged among the same keys.

The primary letter and digraph sets unlike conventional keyboards provide (TO, OR, EN, T, I, ON), (TH, E, AN, D), (ER, IN, G, Y, RE, N, ED) and (QU, Q). With this feature alone multiple key strokes are reduced by at least 24.1%. With the most common component words and trigraphs derived with the featured keys include QUE, QUA, QUI, THE, ETH, ITH, ION, ONE, TEN, ENT, END, ENV, FOR, TOR, TER, FER, GER, BER, INT, INY, REY, REG, GED, EDY, AND, ANY, ANI, etc. The MDK also include default linguistic settings that are function key controlled. Default linguistic settings for MDK feature keys are the language digraph values, that is in normal mode pressing "EN" alone will give "en". Pressing the "SHIFT" function key in combination with key "EN" will produce "EN" in upper case. In Caps lock mode the values summoned would be "EN" an "en" in reverse. Composite key features include DUAL which accesses secondary feature key values and DUAL SHIFT which accesses and shifts on secondary feature key values. In normal mode the "DUAL" key used in combination with key "EN" summons ".biz" value and "DUAL SHIFT" summons the ".BIZ" value. These key features along with the CTRL, ALT, and DELETE keys are arranged vertically in the center area of the keyboard. The second embodiment includes all the attributes of the first embodiment of the MDK system, except the second embodiment keyboard driver provides flexibility to either set the functionality of the keys to static or dynamic modes for simple use. The static feature allows a user to pre-select values of keys from a pre-defined list or user-defined program. The keyboard according to both embodiments can be arranged as separate keyboard features utilizing the QWERTY model for both dual and single hand users, full or limited dexterity and/or left or right oriented keyboards. Other features include a cable connected numeric pad extension and optional adjacent LCD calculator.

Accordingly, it is a principal object of the invention to provide an ergonomic keyboard which reduces injuries from repetitive motion for both dual and single handed users, by reducing keystroke activity under improved comfort also.

It is another object of the invention to provide an ergonomic keyboard which utilizes a plurality of predefined keys having statistically extrapolated characters, words, groups of words and special commands within a single key to reduce repetitive key use of the most used characters, words, etc. in computer and Internet related applications by default.

It is a further object of the invention to provide an ergonomic keyboard which can be segmented and mountable to a base.

Still another object of the invention is to provide an ergonomic keyboard which is adjustable in orientation regarding approach, inclination and declination for left and right hand use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3A is perspective view of a left-hand-side (LHS) computer key module according to a first embodiment of the invention, illustrating the utilization of a Liquid Crystal Display (LCD) calculator operable via "NUM LOCK" activation.

FIG. 3B is perspective view of a Left-Hand-Side (LHS) computer key module according to a second embodiment of the invention, illustrating the utilization of a Liquid Crystal Display (LCD) calculator, similarly operable via "NUM LOCK" activation.

FIG. 3C is perspective side view of FIG. 3B, illustrating special contours of the Left-Hand-Side (LHS) computer key module according to a second embodiment of the invention.

FIG. 5C depicts a first ergonomic orientation of the ergonomic keyboard according to the second embodiment of the invention.

FIG. 5D depicts a second ergonomic orientation of the ergonomic keyboard according to the second embodiment of the invention.

FIG. 5E depicts a third ergonomic orientation of the ergonomic keyboard according to the second embodiment of the invention.

FIG. 5F depicts a fourth ergonomic orientation of the ergonomic keyboard according to the second embodiment of the invention.

FIG. 5G depicts a fifth ergonomic orientation of the ergonomic keyboard according to the second embodiment of the invention.

FIG. 8A is a table depicting a first composite key configuration according to the invention.

FIG. 8B is a table depicting a second composite key configuration according to the invention.

Similar reference characters denote corresponding features consistently throughout the attached drawings.

DETAILED DESCRIPTION OF THE PREFERRED EMBODIMENTS

The present invention is directed to an ergonomic keyboard far single and dual hand, full or limited dexterity, and right or left hand orientation users as a Multi-Dexterous Keyboard (MDK) system which reduces Repetitive Stress/Strain Injuries and other related ailments associated with keyboard use. The preferred embodiments of the present invention are depicted in FIGS. 2, 5, 5A and 5B, and are generally referenced by numerals 8, 9, 11 and 13, respectively. Other elemental features of the invention are depicted in FIGS. 3, 4, 6, and 7–7H, and are separately enumerated by way of comparison to conventional keyboard features as shown in FIG. 1.

Figure 1:
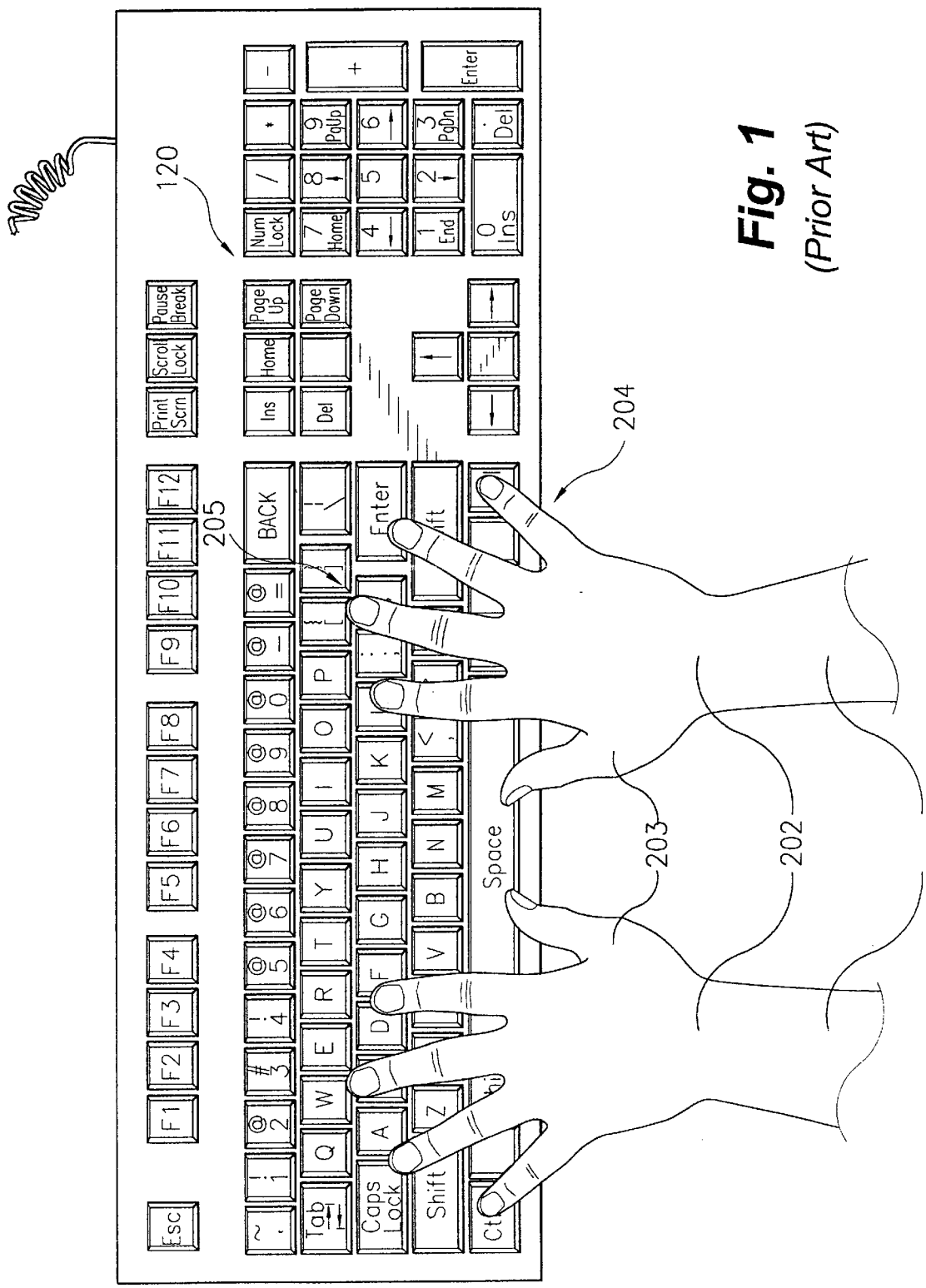
FIG. 1 is an environmental, perspective view of a conventional ergonomic keyboard.

As diagrammatically illustrated in FIG. 1, a conventional ergonomic keyboard 120 is shown according to the QWERTY layout standard. The keys are arranged in straight rows with a user hands 203 shown to illustrate the natural position of the fingers 204 in a relaxed or optimally beneficial typing position. The tips of the fingers 205 form an arc with respect to the keyboard 120 simply from the differing lengths of the fingers 204, including the thumbs of each respective hand 203. To conform to straight rows of keys of the key board 120, fingers 204 are forced to be held in an unnatural position while poised to type over a row of designated home keys. This unnatural position causes significant hand discomfort from repetitive key strikes and makes touch typing more difficult due to the tendency of the fingers 204 to stray or extend from the home row of keys. This conformed straight line of home keys forces ulnar deviation and pronation that are the main causes of RSI with keyboard users.

First Embodiment

Figure 2A:
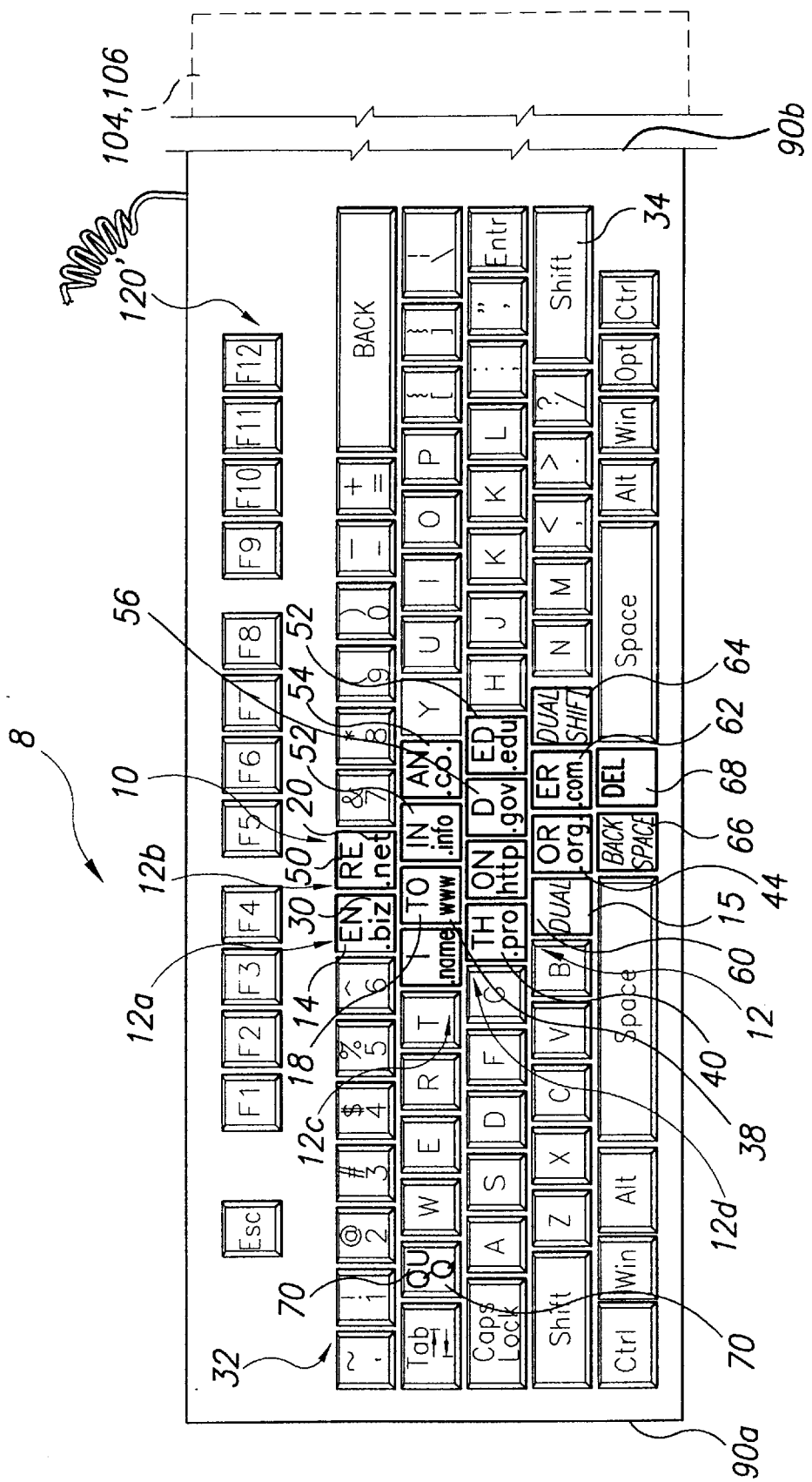
FIG. 2A is a first embodiment of an ergonomic keyboard according to the invention, illustrating a staggered cross key configuration in bold.
Figure 2B:
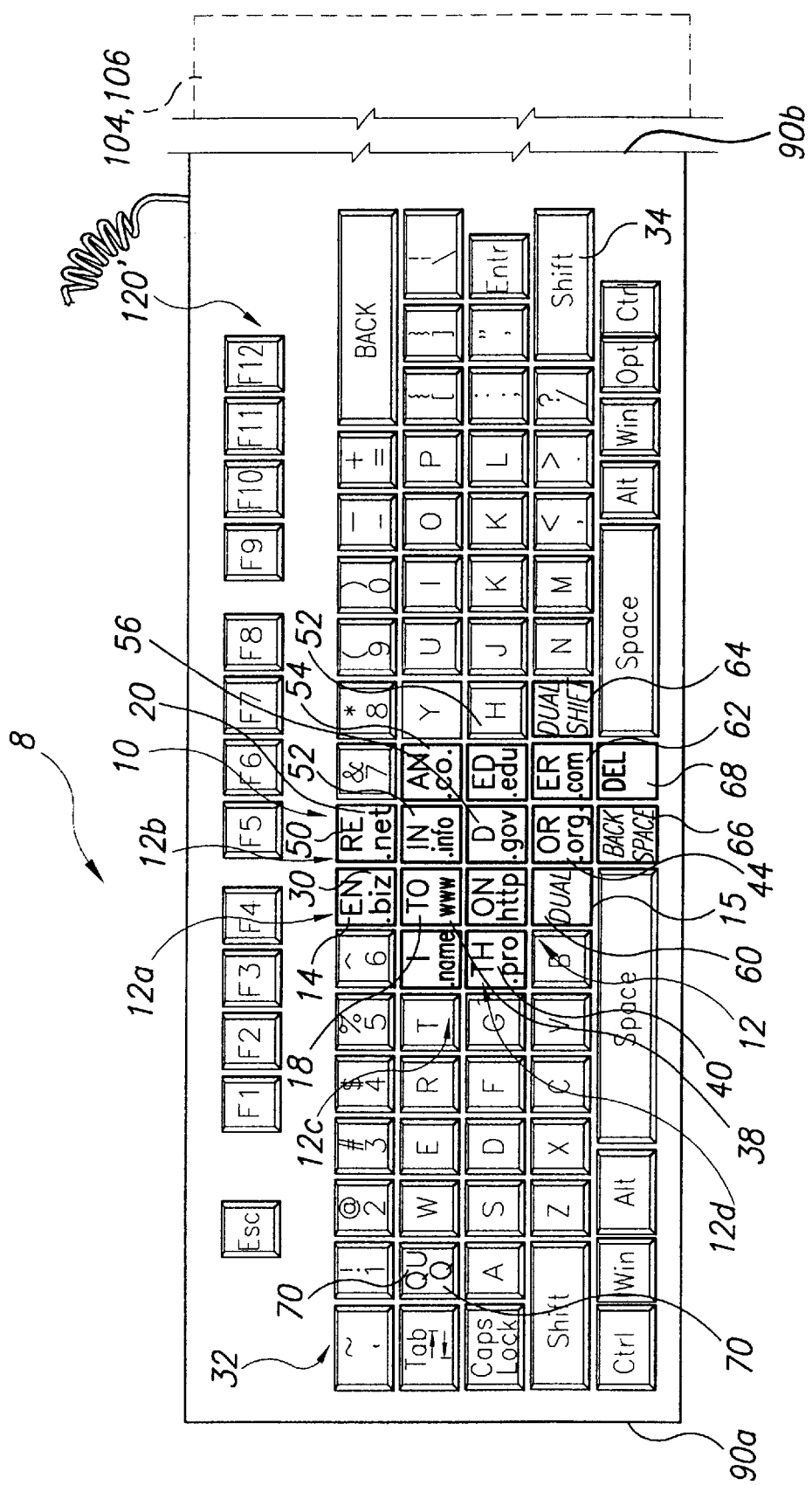
FIG. 2B is the ergonomic keyboard depicted in FIG. 2A according to the invention, except that the staggered cross key configuration is shown in a non-staggered arrangement with preconfigured keys vertically aligned in columns with respect to an adjacent set of horizontally aligned rows of preconfigured keys.

As diagrammatically illustrated in FIGS. 2A and 2B, a modified QWERTY keyboard 8 is shown according to a first embodiment of the invention having a plurality of keys 12 outlined in bold 15 (or as a color coded outline) and disposed within a substantially central portion 10 of the keyboard 8. Each key within the plurality of keys 12 include, by default, statistically extrapolated indicia disposed on a top surface in the form of at least one of characters, words, word groups and/or special commands which remedy the conventional problem of repetitive key strikes and/or optimize typing output in computer and Internet related applications based on the most commonly used characters, words, word groups and special commands of a particular language (eg. English by default, French, German, etc.).

Further, keys 12 are oriented within the keyboard having a plurality of keys 120' with selective indicia of the most used special software application based commands, acronyms and/or mnemonics, by default Internet URL commands (i.e. "www", ".inf", ".name", ".gov", "http", ".org", ".com", ".edu", ".biz", ".net", etc.) to minimize the noted hand 203 discomforts and subsequent injuries resulting from Repetitive Stress Injuries (RSI) and other related injuries.

As shown in FIG. 2, the ergonomic keyboard 8 according to the first embodiment of the invention comprises a plurality of keys 12 with at least one form of functional indicia statistically extrapolated from a language as the most used characters 14, words or word groups 18 and special commands 20. According to a preferred embodiment each set of characters 14, words or word groups 18 are taken from a statistical data study of the most commonly used words in the form of a digraph (i.e. coupled letters) such as (TO, OR, EN, T, I, ON), (TH, E, AN, D), (ER, IN, G, Y, RE, N, ED) and (QU, Q) and/or a trigraph (i.e. tripled letters) such as featured keys having indicia of QUE, QUA, QUI, THE, ETH, ITH, ION, ONE, TEN, ENT, END, ENV, FOR, TOR, TER, FER, GER, BER, INT, INY, REY, REG, GED, EDY, AND, ANY, ANI, etc. With this feature alone multiple key strokes are reduced by at least 24.1%.

The MDK system is also configured to include default linguistic settings that are function key controlled. Default linguistic settings for MDK feature keys are the language digraph values, that is in normal mode pressing "EN" alone will give "en". Pressing the "SHIFT" function key in combination with key "EN" will produce "EN" in upper case. In Caps lock mode the values summoned would be "EN" and "en" in reverse. Composite key features include DUAL which accesses secondary feature key values and DUAL SHIFT which accesses and shifts on secondary feature key values. In normal mode the "DUAL" key used in combination with key "EN" summons ".biz" value and "DUAL SHIFT" summons the ".BIZ" value. These key features are arranged vertically in the center area of the keyboard along with the CTRL, ALT, and DELETE keys. Each special secondary commands can include commands such as "www", ".inf", ".name", ".gov", "http", ".org", ".com", ".edu", ".biz", ".net", etc., but are not limited thereto. Since each language whether English, French, German, etc. has distinct linguistic characteristics inherent to its etymology and principal area of technological or otherwise application of origin, it would be obvious to one skilled in that language to construct special primary commands to provide the necessary functions and language based commands.

In this regard, numerous key orientations are possible, except or excluding those orientations which minimize typing speed, and detract from preventing repetitive key strikes which lead to RSI. Thus, the plurality of keys 12 include at least a first 12a and second column 12b of keys arranged substantially in a vertical orientation, and at least a first 12c and second row 12d of keys arranged horizontally and aligned substantially vertically with respect to each other (i.e. the respective rows 12c,12d) for efficiently producing a series of characters 14, words or word groups 18, and functional commands 20 for subsequent processing by software resident in a computer device.

The central set of keys 12 are disposed within the keyboard 8 so as to form a substantially cross pattern indicated by the bold rim portion 15 or color coded keys, respectively. Each key defined within the first and second column 12a,12b of keys include combination primary functional indicia of characters 14 taken from a digraph of most used coupled letters or single characters from a particular language (i.e. English, French, German, etc.) and a special secondary command 20 in the form a preprogrammed command or a user defined programmable command for activating, by default, internet related software applications thereby reducing keystroke activity and minimizing repetitive stress injuries. Some of which are associated with finger extensions for specific keys operatively positioned beyond a hand span 203 of a user.

For example, the ergonomic keyboard 8 according to the first embodiment includes a first column 12a of keys defined by the central portion 10 wherein a first key 30 positioned within a linear row 32 of numeric keys has combination indicia of EN and .biz disposed thereon. Default linguistic settings for MDK feature keys are the language digraph values, that is in normal mode pressing EN alone will give en. Pressing the SHIFT function key in combination with key EN will produce EN in upper case. In Caps lock mode the values summoned would be EN and en, respectively.

Composite key features include DUAL which accesses secondary feature key values and DUAL SHIFT which accesses and shifts on secondary feature key values. In normal mode the DUAL key used in combination with key EN summons .biz value and DUAL SHIFT summons the BIZ value. These key features along with the CTRL, ALT, and DELETE keys are arranged vertically in the center area of the keyboard. This protocol is demonstrated for each respective MDK feature key as diagrammatically illustrated in FIGS. 2A and 2B, respectively.

Below key 30 and arranged substantially vertical therewith is at least one second key 36 having combination indicia of I and .name disposed thereon. Another key 38 is also shown disposed adjacent to the second key 36 and being substantially vertically aligned with key 30 and having combination indicia of TO and www disposed thereon. In a similar way, the most commonly used digraph characters 14 are invoked utilizing the protocol recited above or via an analogous programmed command key 34, and the special designated command 20 for Internet related applications is automatically invoked according to the QWERTY standard or convention as recited above.

The first column of keys 12A includes ergonomic structured keys 30, 36, 38, 40, 42 and 44. Key 40 has formed within its top surface statistically extrapolated data of the most used characters TH according to the English language in combination with the command .pro; key 42 is shown having combination indicia of the word or characters of ON and the command of http; and key 44 is shown configured with the character or word indicia of OR and the command . org.

The second column of keys 12b defined by the central portion 10 include a first key 50 positioned adjacent key 30 and disposed within the linear row 32 of numeric keys. The first key 50 of the second column of keys 12b has disposed thereon combination indicia of RE and .net. Similarly, the most used digraph characters RE of key 50 are invoked by utilizing the protocol recited above or via an analogous user defined or programmable key 34 by simultaneously pressing the key 50 for invoking the most commonly used dual characters RE.

As recited above, the special command .net of key 50 is automatically invoked as a primary key function according to the protocol recited above or via an analogous preprogrammed or user defined command key 34. Below key 50, and arranged substantially in vertical alignment therewith is at least one second key 52 having combination indicia of IN and .info disposed on the top surface of the key made in conventional construction according to the QWERTY or similar keyboard layout. Key 38 of the first column of keys 12a constitutes another key being in common and adjacent to key 52 as a substantially vertically aligned ergonomic key with respect to both key 38 and key 50 of the second column 12b. Key 54 having combination indicia of AN and .co. disposed thereon is also shown disposed adjacent to the second key 52, but being disposed substantially offset to the right in vertical relation with key 50.

Notwithstanding, this arrangement still places key 54 within the reach of a single hand span 203 illustrated in FIG. 1 by comparison. The primary difference being a user has an optimally arranged set of keys formed with statistically extrapolated indicia or characters 14 and special commands 20 which significantly reduces unnecessary finger extensions and related fatigues beyond a user's hand span 203.

Accordingly, other key configurations made in substantially vertical relation with respect to key 50, at least, include key 56 having combination indicia of the most commonly used character D and the command .gov; key 58 having a combination of indicia including the characters ED and the command .edu; and key 62 having a combination of indicia including the most commonly used characters ER and the command .com.

According to the QWERTY convention, secondary characters in such as the exclamation mark (!), the percent sign (%), the dollar sign ($), etc. are invoked utilizing the function key protocol as recited above. The most commonly used digraph or trigraph characters 14 and special software application commands 20 for Internet related applications are invoked utilizing an analogous DUAL and DUAL SHIFT command key. Thus, the second column of keys 12A comprises ergonomic efficient keys 50, 52, 38, 42, 44, 56 and 64. The underline designates keys shared in common with both the respective first and second columns of keys 12a and 12b, as substantially vertically aligned keys made with respect to keys 30 and 50, respectively. With this designation a single or dual handed user has quick an immediate access to the most commonly used characters 14 and commands at his/her finger tips 205 without unnecessary flexing or extensions beyond designated home keys or a single hand span 203. In addition, a user is not presented with the drastic psychological factors of having to relearn how to use a brand new keyboard when the QWERTY model has been modified to improve efficiency and to reduce repetitive key strikes and the like to minimize Repetitive Strain Injuries (RSI).

The cross formation defined by the plurality of keys 12 formed within the central portion 10 of the keyboard 8 is formed by the intersection of the first and second row of keys 15a and 15b, with the first and second column of keys 12a and 12b, respectively. The formation of which produces a Multi-Dexterous Keyboard system 8 configured with selective statistically extrapolated indicia representing the most commonly used characters 14 or words or word groups 18 and special commands 20 in a specific language for significantly reducing repetitive related keyboard strikes at least by some 24.1%.

Accordingly, the first row of keys 12c of the MDK system 8 includes ergonomic keys 36, 38, 52 and 54. Keys 36 and 38 have been italicized to indicate the spatial relationship keys 36 and 38 have with key 30 of the first column 12a, in that keys 36 and 38 are formed within the central aperture 10 in substantially vertical relation with key 30. In contrast, keys 52 and 54 have been underlined to indicate the spatial relationship keys 52 and 54 have with key 50 of the second column 12b, in that keys 52 and 54 are disposed within the central aperture 10 also in substantially vertical relation with key 50. of particular note, key 54 is arranged adjacent to key 52 and offset from key 50 at least a half key distance (but no more than a single key distance made with respect to at least one common adjacent key disposed within the central portion 10) to reduce finger crowding or concentration in a single localized area. A conservative arrangement can include perfect alignment of the respective keys 12 as diagrammatically illustrated in FIG. 2B as a custom feature depending upon specific dimensions of the respective keys.

Similarly, the second row of keys 15b includes a plurality of intersecting keys 40, 42, 56 and 58 which provide the horizontal cross feature of the ergonomic designed central aperture 10 according to the invention. Both rows 15a and 15b form respective rows with keys disposed in common with the keys 30,50 of the respective first and second columns 12a, 12b. That is, keys 40 and 42 have been italicized to indicate the respective spatial relationship with key 30 of the first column 12a and the common relationship with the adjacent keys 36 and 38 of the first row 15a, in that keys 40 and 42 are commonly formed within the central aperture 10 in substantially vertical relation with keys 30, 36 and 38, respectively.

In contrast, keys 56 and 58 have been underlined to distinguish their respective spatial relationship with key 50 of the second column 12b, and with the adjacent keys 52 and 54 of the first row 15a disposed within the central aperture 10, such that keys 56 and 58 are also arranged in substantially vertical relation with keys 50, 52 and 54, respectively. Of particular note, key 58 is arranged adjacent to key 56 by a half key distance and offset from key 50 in vertical alignment to reduce finger crowding or concentration in a single localized area of the keyboard 8.

As mentioned above special function keys such as the DUAL function key 60, DUAL SHIFT key 64, BACK SPACE key 66, and the DEL key 68 provide respective access to secondary functions, access to shift on secondary values and to quickly and efficiently delete characters or text within the hand span of a respective user. These keys are centrally disposed between a split space and double space bar for easy and convenient user access. In most conventional keyboards, the SHIFT key 34 uses the secondary letter key values for non MDK featured keys, and toggles between lower and upper case indicia with MDK featured keys.

While the SHIFT key 34 will work normally as used in existing keyboard operations, it is also used to access selective languages (i.e. English, French, German, etc.) as a secondary feature in the MDK system. The DUAL/DUAL SHIFT keys work only with the secondary or tertiary key values. In the current MDK system, the combination characters 14 or pair values for the conventional Q key has been changed and reversed since the letter Q is rarely used (according to the statistical studies below) singularly and is primarily paired with the letter U to form the majority, if not all, prefixed QU words. Accordingly, key 70 includes wherein qu is the primary value, QU the secondary value and q the tertiary value. For example, the word "query" can be performed in three key strokes (QU,ER,Y) as opposed to five. Also, the punctuation keys in the first embodiment 8 reflect top punctuation as the secondary value and the bottom punctuation as the primary value.

Thus, the statistically extrapolated keyboard features of the MDK system have been arranged within the central portion of the keyboard 10 for fast and efficient primary, secondary and tertiary use of key functions. The keys shared in common with respect to the first and second columns 12a, 12b as identified above provide efficient and effective access to a single, dual, full or limited dexterity user, and right or left handed oriented user for utilizing the most commonly used characters and commands in a specific language without the need for unnecessary finger extensions and curls beyond the reach of designated home keys and/or beyond the hand span of the user. Special hand accommodations have been provided for in FIGS. 2A and 2B according to the first embodiment 8 to include end adaptive features along edges 90a (or 90b) for a Left-Hand-Side (LHS) and Right-Hand-Side (RHS) numeric or computer keypad modules (100,102) and (104,106), respectively. Each respective embodiment (100,102) and (104,106) of the computer key pad modules utilizes Liquid Crystal Displays (LCDs) 110 of generally conventional construction for displaying calculations as a separate connectable and/or an integral keyboard 8 feature.

As diagrammatically illustrated in FIGS. 3A–3C, the Left-Hand-Side (LHS) computer key module with memory keys is shown according to a first embodiment 100 and a second embodiment 102. The common features in both LHS and RHS embodiments 100,102 include the Liquid Crystal Display (LCD) 110 and a linear arrangement of special command or function keys Seq Lock 92, Ctrl Lock 94, Alt Lock 96 and DUAL LOCK 98. These particular keys 92, 94 and 96 are preferably color coded (i.e. red, blue etc.) to provide lock on sequential typing as opposed to default simultaneous typing, lock on CTRL and ALT key values. The latter two are useful for single hand, limited dexterity users who mainly gravitate to graphics environments which heavily uses such keying facilities.

In the first embodiment 100, the DUAL LOCK key 98 locks current secondary feature key values and is preferably color coded in red. For example, during word processing the DUAL LOCK key 98 locks digraph values even during application switching until deactivated. A side perspective view of the auxiliary numeric key pad 102 is shown to illustrate custom contour features C of the module 102. The LHS embodiment 100 is adapted to edge 90a, and the RHS embodiment 104 is adapted to edge 90b via conventional means (i.e. latch mechanisms, magnetic couplings, plastic sleeves or mechanical fasteners, etc.).

Figure 4A:
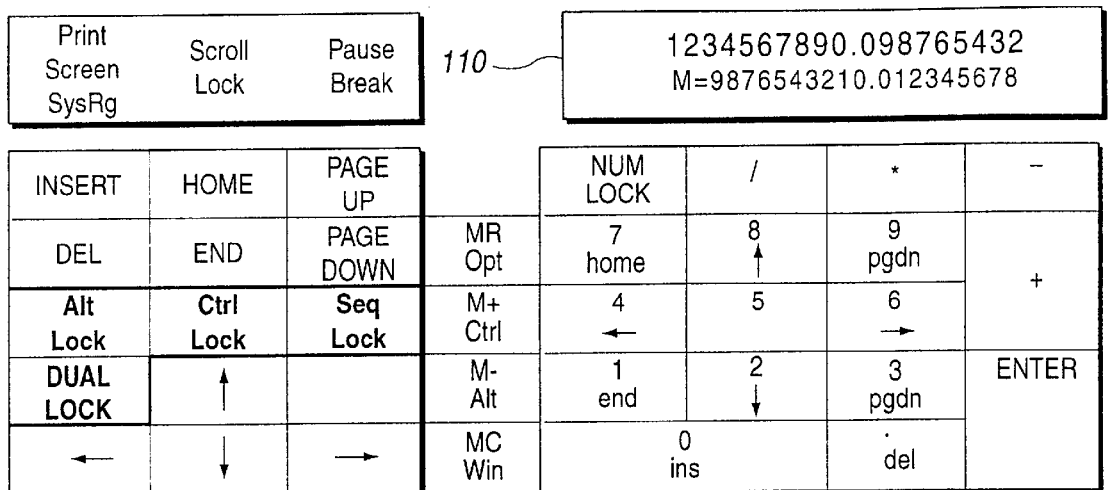
FIG. 4A is perspective view of a Right-Hand-Side (RHS) computer key module according to a first embodiment of the invention, illustrating the utilization of a Liquid Crystal Display (LCD) calculator, operable via "NUM LOCK" activation.
Figure 4B:
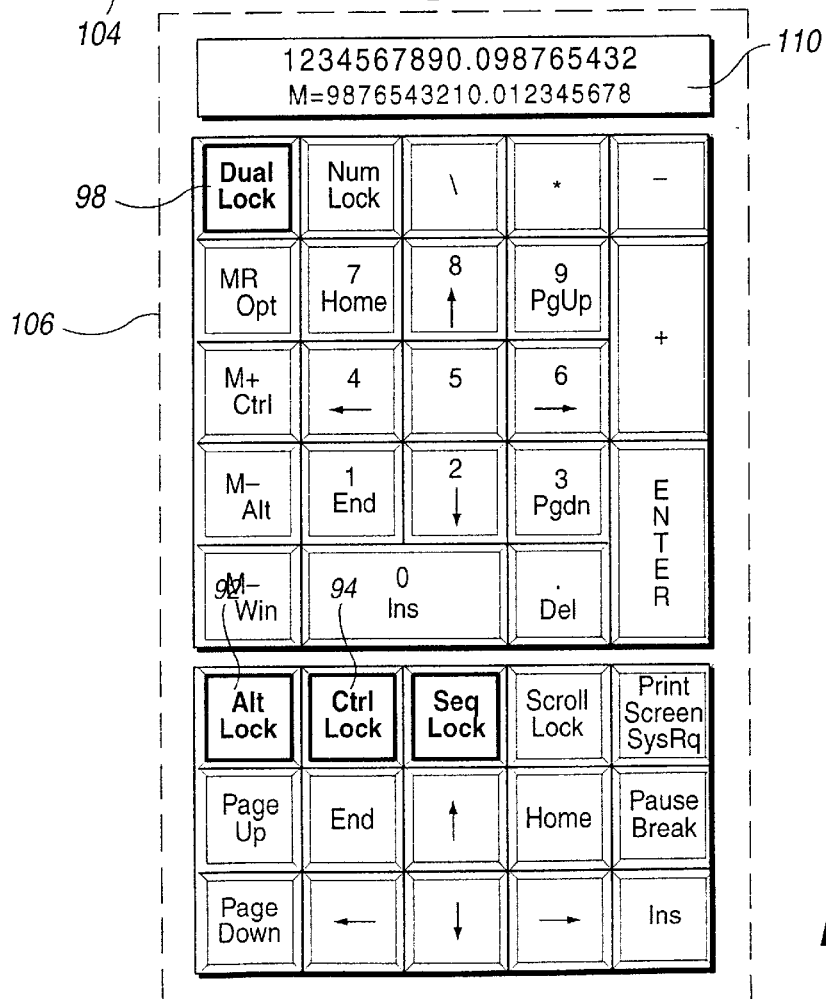
FIG. 4B is perspective view of a Right-Hand-Side (RHS) computer key module according to a second embodiment of the invention, illustrating the utilization of a Liquid Crystal Display (LCD) calculator, operable via "NUM LOCK" activation.

As diagrammatically illustrated in FIGS. 4A and 4B, the RHS computer key module is shown according to a first embodiment 104 and a second embodiment 106. As with the LHS computer key modules 100,102 the RHS embodiments 104,106 include the Liquid Crystal Display (LCD) 110 and a similar linear arrangement of special command or function keys Seg Lock 92, Ctrl Lock 94, Alt Lock 96 and DUAL LOCK 98, whereby these keys 92,94 and 96 provide lock on sequential typing as opposed to default simultaneous typing, lock on CTRL and ALT key values. The latter two are useful for single hand, limited dexterity users who mainly gravitate to graphics environments that heavily use such keying facilities. However, this module 104,106 is adapted for attachment to the keyboard 8 via edge 90*b* via conventional means as recited above. While no special side contours C have been illustrated for the RHS computer modules 100 and 104, it would be obvious to one having ordinary skill in the relevant art to provide a custom, keyboard contour or design according to an intended use as a matter of personal preference, or contoured edgewise with the first embodiment.

In both instances, the LHS and RHS adapted modules 100,102 and 104,106 serve to provide auxiliary keypad and calculator features with adaptations operatively configured as integrally electrical connections or as an independent module with a resident Direct Current (DC) or Alternating Current connection power source. The according to claim 2, wherein said combination auxiliary module includes a liquid crystal display (LCD) for displaying various calculations.

The second embodiment includes all the attributes of the first, except the second embodiment provides flexibility in keyboard segmentation and orientation for simple or ease of use. The static feature allows a user to pre-select values of keys from a pre-defined list or user-defined program. The keyboard according to both embodiments can be arranged as separate keyboard features utilizing the QWERTY model for both dual hand, single hand, full or limited dexterity users.

Second Embodiment

Figure 5:
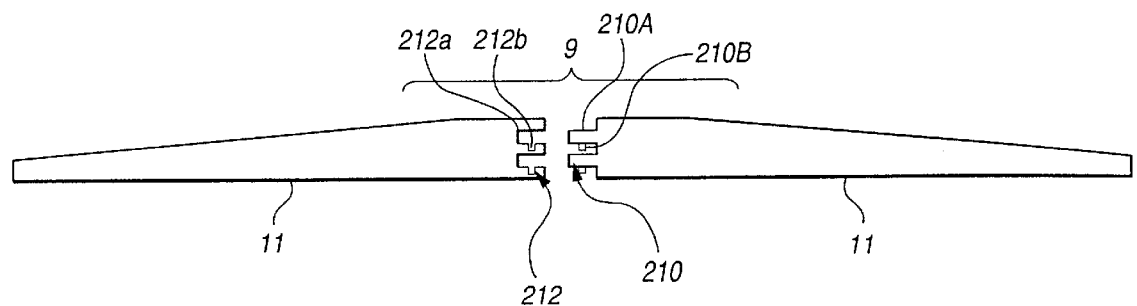
FIG. 5 is a second embodiment of an ergonomic keyboard according to the invention, illustrating selective adaptation of either the LHS or RHS module.
Figure 5A:
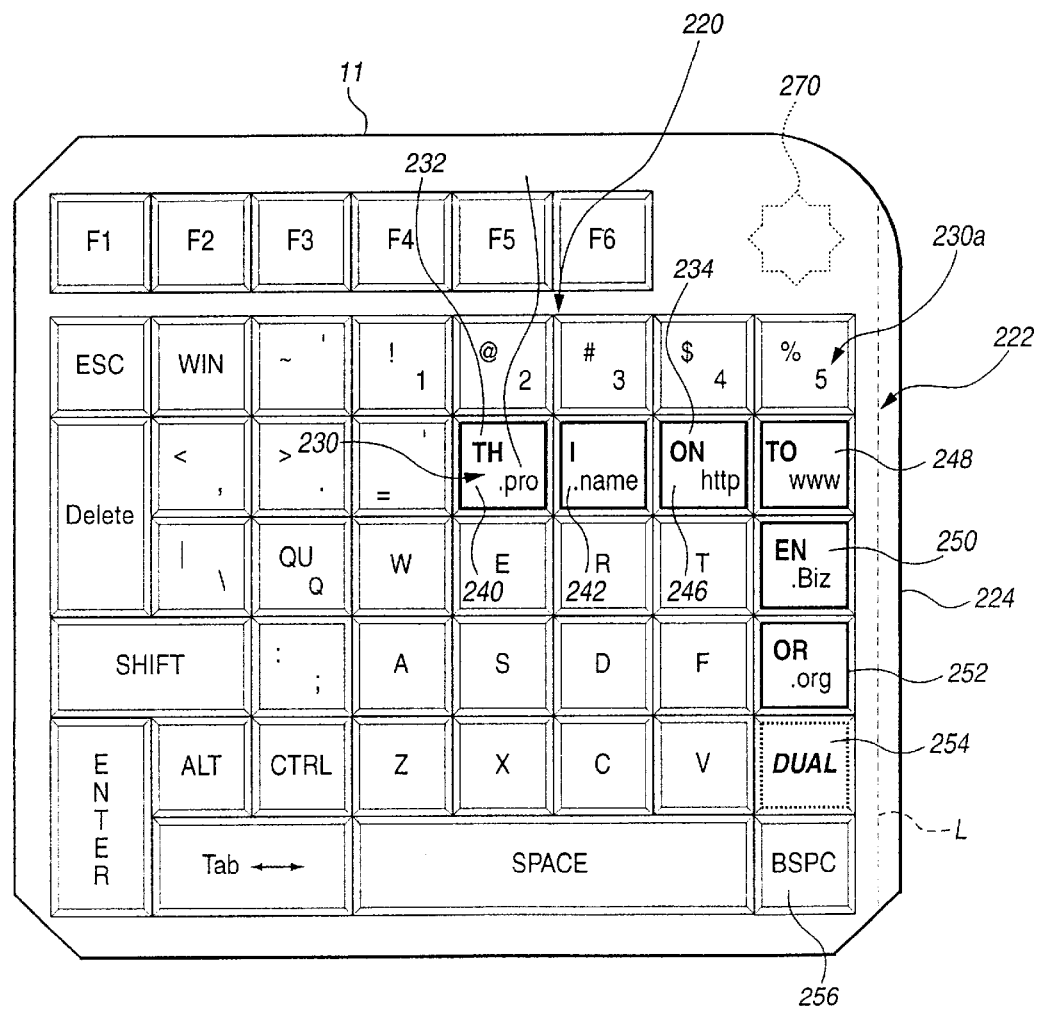
FIG. 5A is a Left-Hand-Side (LHS) segment of the ergonomic keyboard according to the second embodiment of the invention.
Figure 5B:
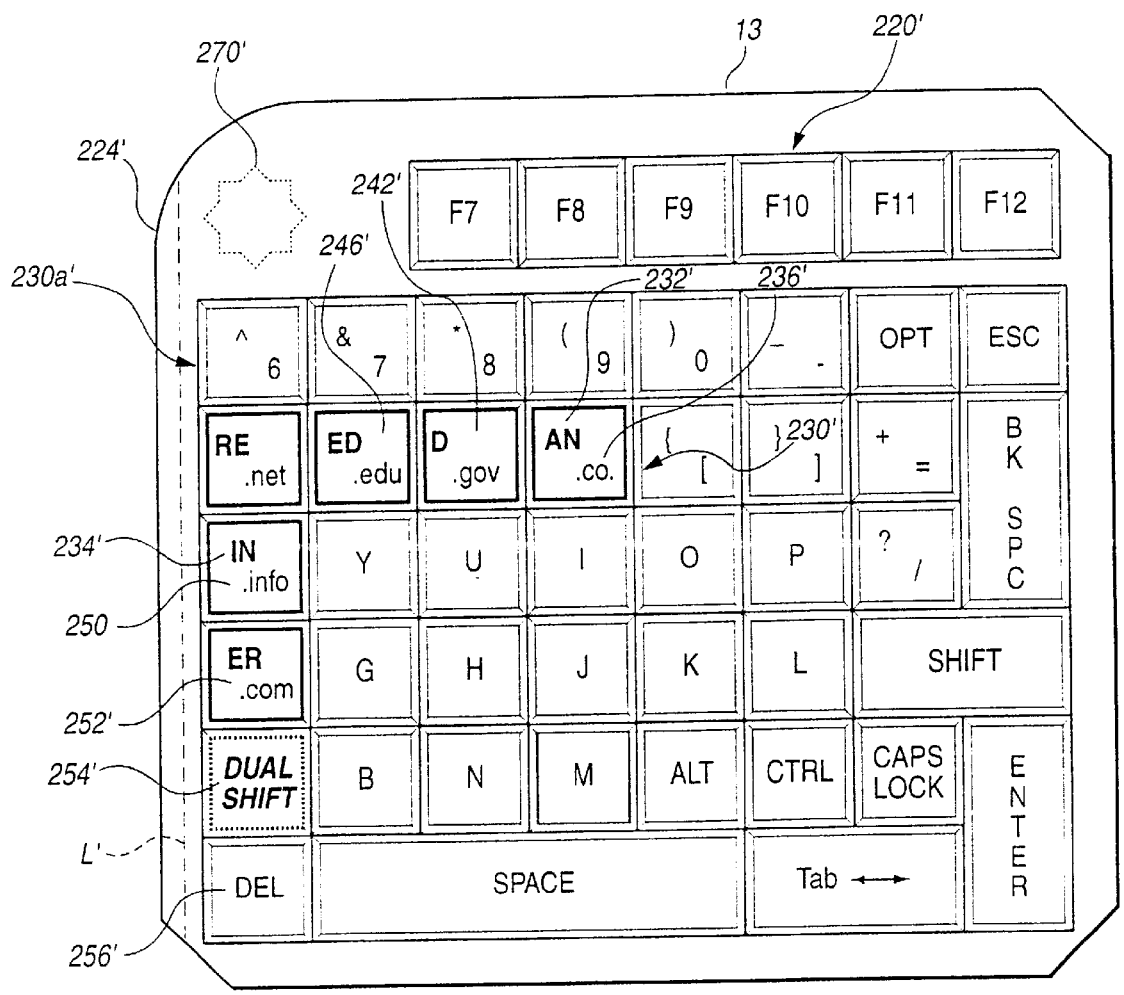
FIG. 5B is a Right-Hand-Side (RHS) segment of the ergonomic keyboard according to the second embodiment of the invention.

As best seen in FIGS. 5–5B, the ergonomic keyboard according to the second embodiment 9, comprises a partitionable or interconnected keyboard 9 having a LHS keyboard portion 11 and a RHS keyboard potion 13. As diagrammatically illustrated in FIG. 5, the MDK system 9 is shown interconnected with via slidable male 210 and female 212 interlocking connections. In a preferred embodiment the LHS keyboard portion 11 is configure a first and second groove 212*a* and 212*b*, respectively. The first groove 212*a* provides a slidable clearance for a first male connector portion 210*a*, and the second or sub-groove 212*b* defined within the first groove 212*a* for slidably receiving a second or sub-component male connector portion 210*b* formed with respect to the first male connector portion 210 as a key-way or male and female connection. Numerous orientation of the male and female connections can be used to include various geometric complimentary male and female interfaces such as triangular, semi-circular, and other shapes as matter of design choice.

As diagrammatically illustrated in FIG. 5A, the LHS computer key board portion 11 is shown comprising a plurality of keys 220 forming a central aperture of keys 222 with respect to the interconnected RHS keyboard portion 13 as a single or combination keyboard system 9. The dotted line L defined with respect to the right edge portion 224 of the keyboard 11 indicates the female groove 212 for interlocking attachment with the RHS keyboard portion 13. As shown therein, the keyboard 11 includes a first row of keys 230 having disposed thereon statistically extrapolated indicia from a particular language as recited above which represents the most used characters 232, words 234 and/or special commands 236 (for Internet or computer related applications) of the respective language to form a multidexterous keyboard system 9.

When assemble, the MDK system 9 forms a substantially central portion of keys 222 which includes a first 230 and second 230' row and a first 230*a* and second 230*a*' column of keys 222. The first row 230 of the LHS keyboard portion 11 comprises keys 240, 242, 246 and 248. As shown therein, key 240 has a combination of indicia disposed on a top surface of the key which includes the characters TH and the command .pro; key 242 has a combination of indicia including the most commonly used character I and the command . name; key 246 has combination indicia including the most commonly used character ON and the command http; and key 248 includes combination indicia of TO and the command www. In a similar fashion as described above, key 248 has been highlighted to indicate or to distinguish it from other keys 230, as a key in common with respect to the first row 230 and first column 230*a* of the LHS keyboard portion 11.

Accordingly, the first column 230*a* of the LHS keyboard portion 11 comprises keys 248 250, 252, 254, and 256. As shown therein, key 248 is a key in common as described above; key 250 has a combination of indicia disposed on a top surface of the key which includes the characters EN and the command .biz; key 252 has a combination of indicia including the most commonly used characters OR and the command .org; key 254 and 256 are special function keys utilizing the DUAL command as similarly recited above and the special BSPC command key for quick access to back space features without having to extend finger reach outside the home keys to do the same according to conventional methods. As a special note the Qkey has been modified in a similar way as depicted in the first embodiment 8 to include wherein qu is the primary value, QU the secondary value and q the tertiary value. In addition, a special recess 270 has been formed in the base of the LHS keyboard portion 11 for attachment with a base having at least three degrees of freedom to include translation and rotation.

As diagrammatically illustrated in FIG. 5B, the RHS computer key board portion 13 is shown comprising a plurality of keys 220' which form a central aperture of keys 222 in combination with respect to the interconnected LHS keyboard portion 11 as a single keyboard system 9. The dotted line L' defined with respect to the right edge portion 224' of the keyboard 13 indicates the length of the male groove 210 for interlocking attachment with the LHS keyboard edge portion 224'. As shown therein, the keyboard 13 includes a first row of keys 230' having disposed thereon statistically extrapolated indicia from a particular language as recited above which represents the most used characters 232', words 234' and/or special commands 236' (for Internet or computer related applications) of the respective language to form a combined multidexterous keyboard system 9.

When assembled, the second embodiment 9 forms a substantially central portion defined by keys 222 which includes a first 230 and second 230' row and a first 230*a* and second 230*a*' column of keys 222. The first row 230' of the RHS keyboard portion 13 comprises keys 240', 242', 246' and 248'. As shown therein, key 240' has a combination of indicia disposed on a top surface of the key which includes the characters AN and the command .co.; key 242' has a combination of indicia including the most commonly used character D and the command .gov; key 246' has combination indicia including the most commonly used character ED and the command .edu; and key 248' includes combination indicia of RE and the command .net. In a similar fashion as described above, key 248' has been highlighted to indicate or to distinguish it from other keys 230', as a key in common or substantially perpendicular alignment with another key in either respective first row 230' and/or column 230a' of the LHS keyboard portion 13 to form a central cross key arrangement for efficient use of keys having statistically extrapolated characters and/or commands which significantly reduces repetitive key strikes and finger extensions which results in RSI.

Accordingly, the second column 230a' of the RHS keyboard portion 13 comprises keys 248' 250', 252', 254', and 256'. As shown therein, key 248' is a key in common having combination indicia of RE and command .net; 250' has a combination of indicia disposed on a top surface of the key which includes the characters IN and the command .info; key 252' has a combination of indicia including the most commonly used characters ER and the command .com; keys 254' and 256' are special function keys utilizing the DUAL SHIFT command as similarly recited above and the special DEL command key for quick access to the respective keys for activating accessing respective secondary functions or deleting of text without having to extend finger reach outside designated home keys to do the same according to conventional methods. Similarly, a special recess 270' has been formed in the base of the RHS keyboard portion 13 for attachment with a base having at least three degrees of freedom to include translation, rotation and inclination.

As diagrammatical illustrated in FIGS. 5C–5G, the ergonomic keyboard according to the second embodiment 9 includes numerous setup configurations for the user. In FIG. 5C one configuration 300 is depicted in a standard horizontal ergonomic orientation. In FIG. 5D a second configuration 302 is depicted with clockwise a rotation of the keyboard 9, having a lower LHS keyboard 11 orientation made with respect to the RHS keyboard portion 13. As diagrammatically illustrated in FIG. 5E, a direct opposite orientation 302' is depicted as an ergonomic alternative to FIG. 5D.

As diagrammatically illustrated in FIG. 5F a fourth ergonomic orientation 304 is depicted showing and LHS keyboard portion 11 and the RHS keyboard portion 13 being disposed with an angle α (of less than 180 degrees) defined between them. According to FIG. 5G, a fifth orientation 306 is depicted having the LHS keyboard portion 11 decoupled from the RHS keyboard portion 13, and to include separate clockwise and counterclockwise ergonomic orientations of each keyboard portion 11,13, respectively.

Figure 6A:
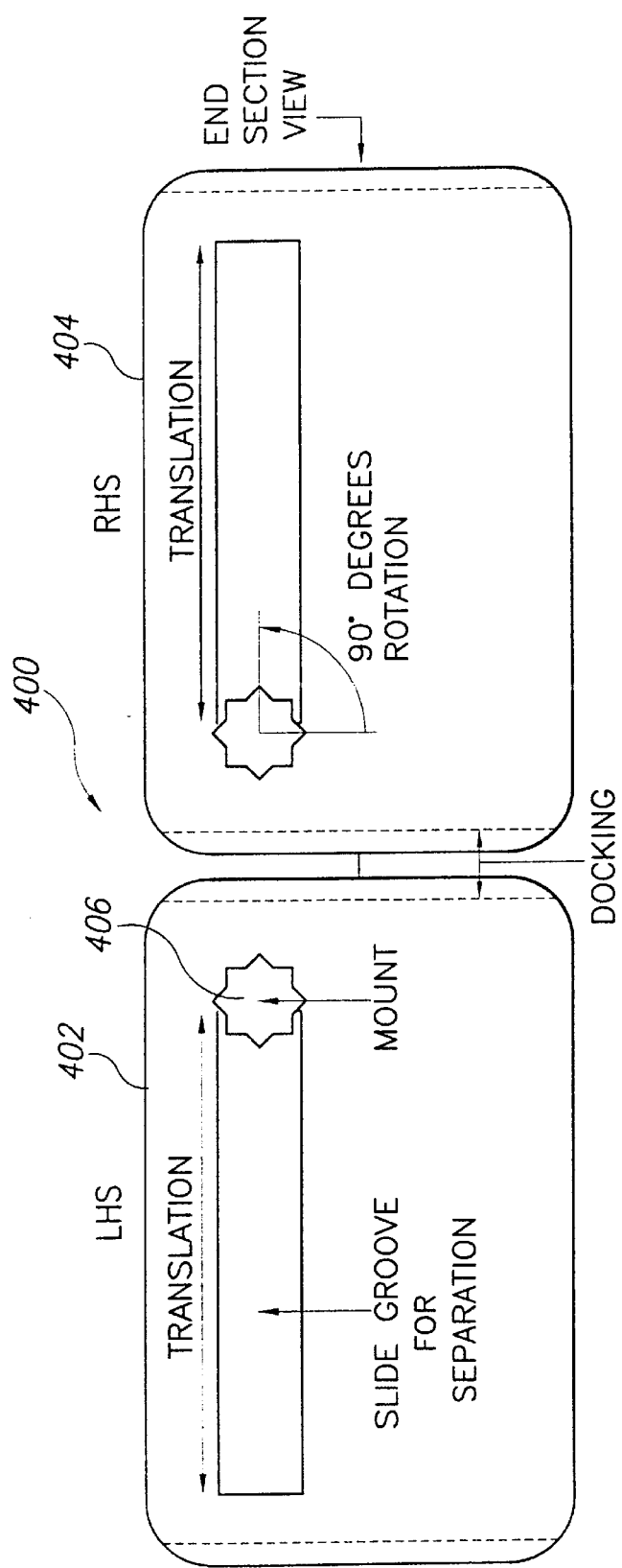
FIG. 6A is a perspective view of a mounting track for the ergonomic keyboard according to the second embodiment.
Figure 6B:
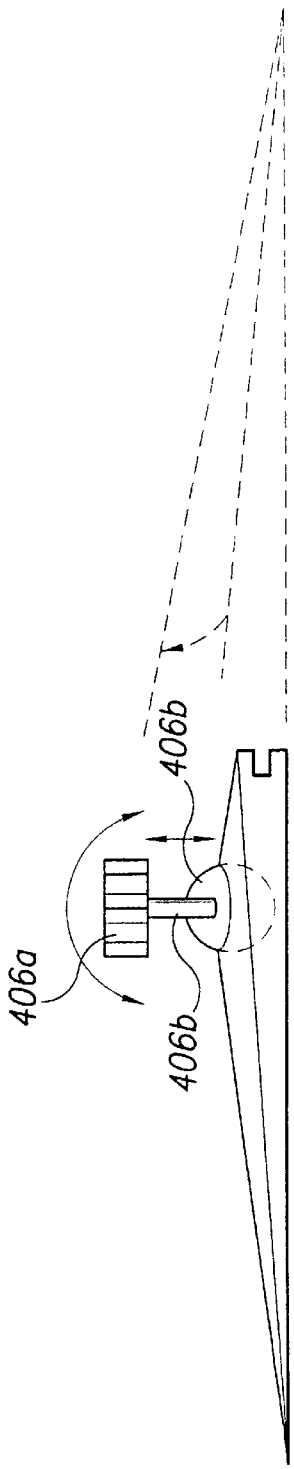
FIG. 6B is a sectional perspective of a mounting track element, illustrating both rotation and translation.

As diagrammatically illustrated in FIGS. 6A and 6B, the maneuverability of the MDK system 9 is confined within a platform or base 400 having first and second base portions 402 and 404, respectively for attaching a respective keyboard portion 11 and 13, respectively. As diagrammatically illustrated in FIG. 6A, each base portion is configured with a pivot attachment mechanism 406 having both translation and pivoting motion as either a frictional interconnected mechanism or a discrete step-wise angular or linear mechanism. The docking of the base can include any number of conventional attachments to include a male and female interconnected attachment as herein described. In operation, the pivot mechanism 406 having a top mount portion of geometric proportion 406a, a stem portion 406b and a rotatable base portion 406c is inserted into a recess 270,270' as a frictional fit to include degrees of freedom of both translation and rotation (in inclination and declination). In a similar fashion as depicted in FIGS. 5C–5G, all depicted ergonomic orientations are possible, but not limited thereto.

Statistical Data Study

Figure 7:
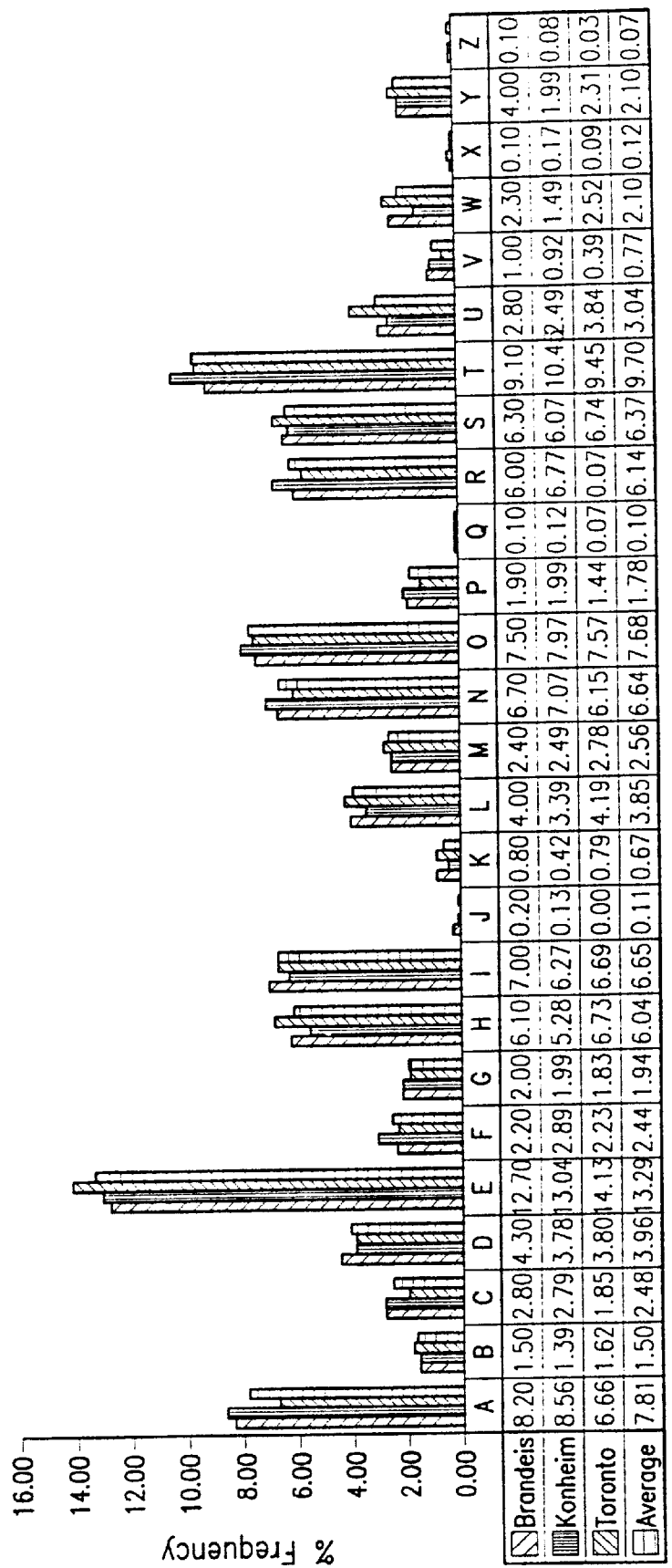
FIG. 7 is an exemplary graph of statistical data on the most used letters in English.
Figure 7A:
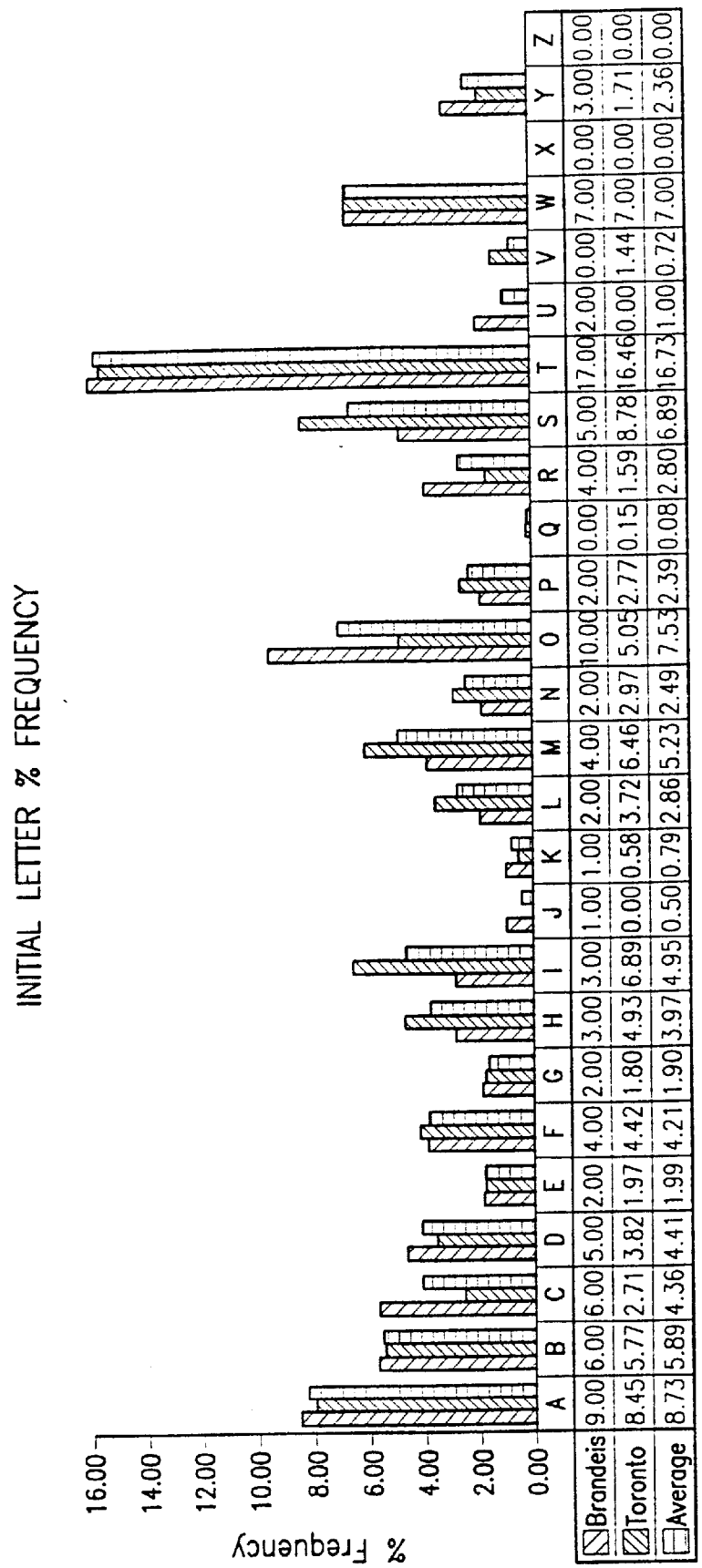
FIG. 7A is an exemplary graph of statistical data of the most used initial letters that start a word in English.
Figure 7B:
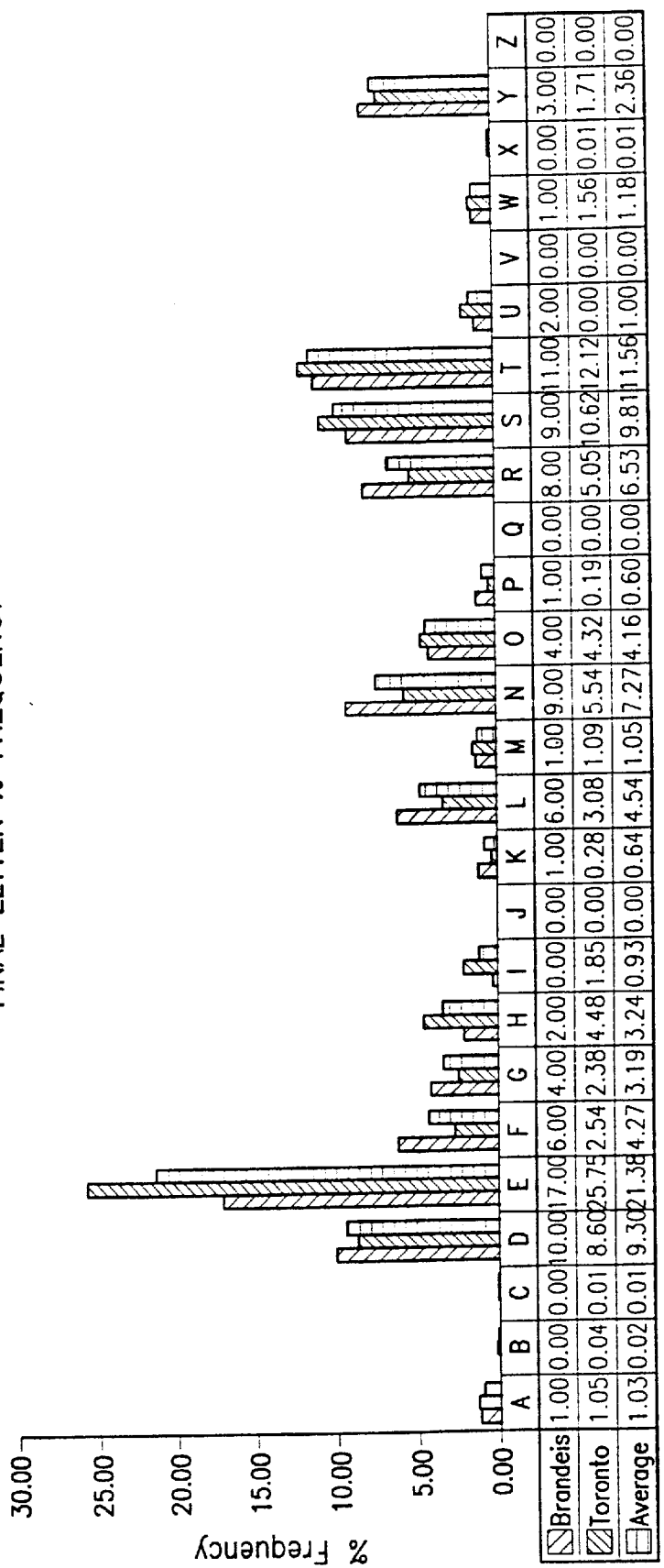
FIG. 7B is an exemplary graph of statistical data of the most used letters which end a word in English.
Figure 7C:
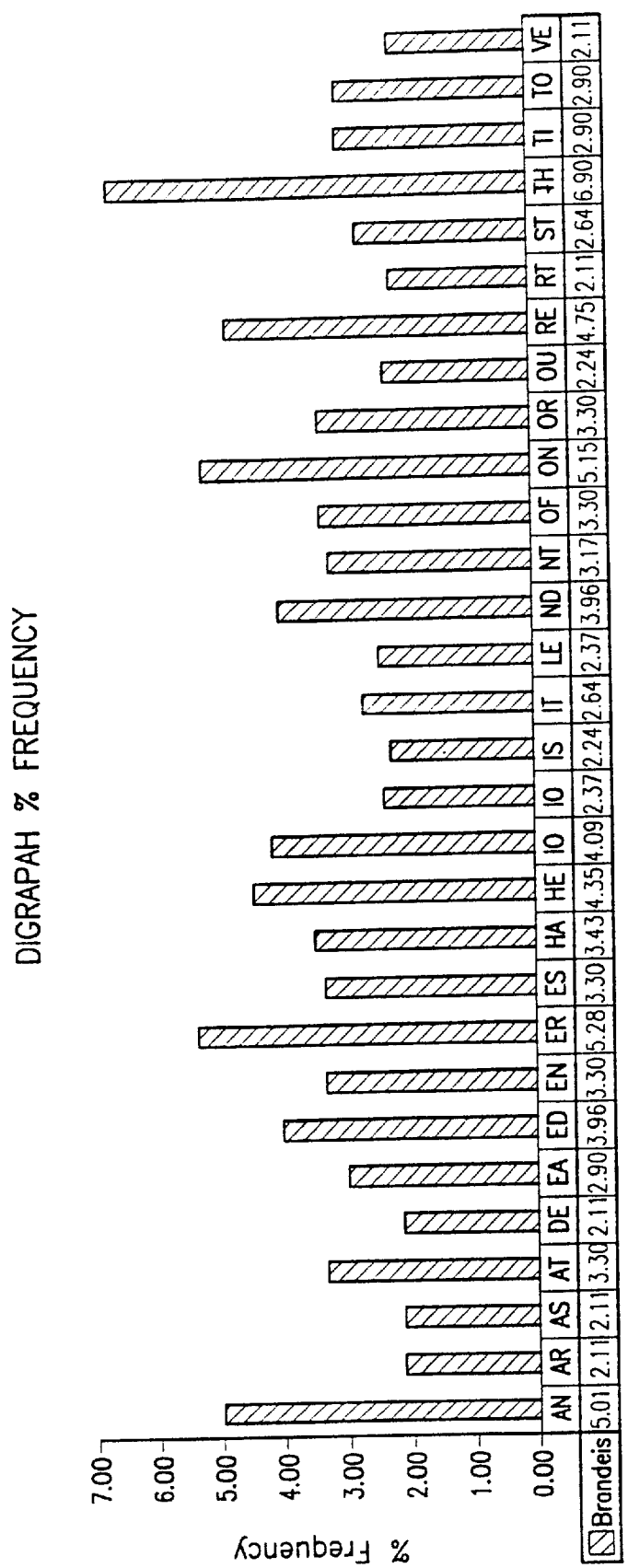
FIG. 7C is an exemplary graph of statistical data in the form of a digraph of the most used combination of two letters or single syllable words used in English.
Figure 7D:
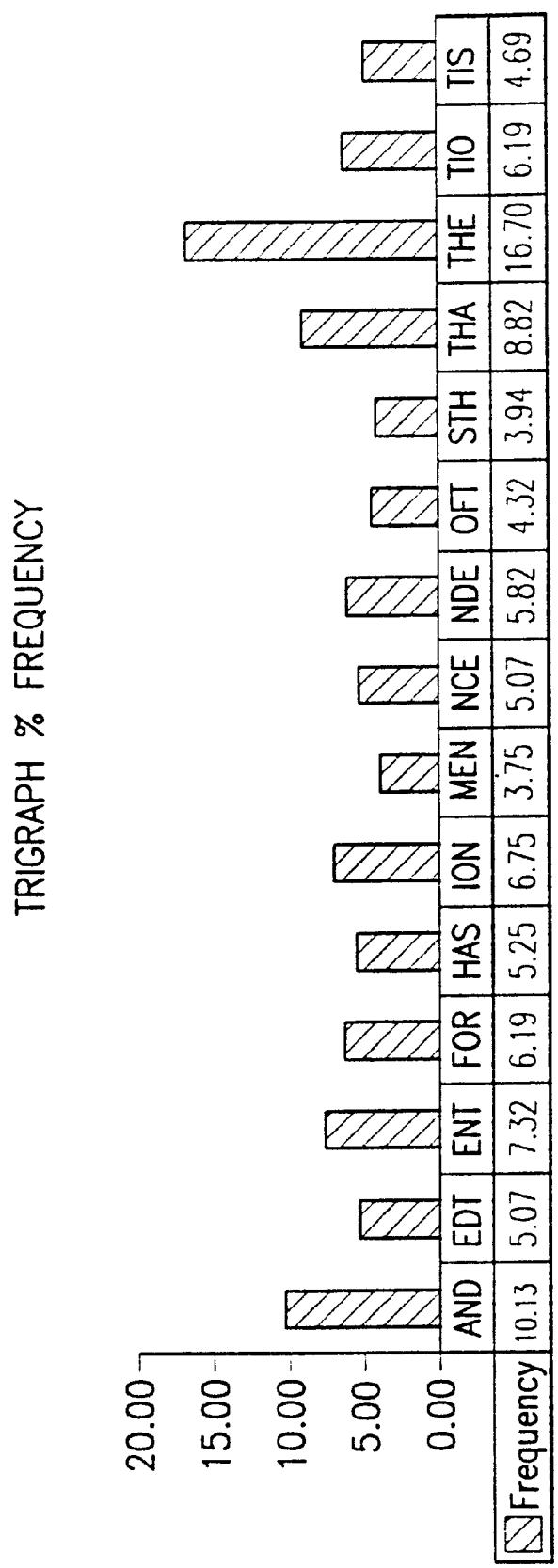
FIG. 7D is an exemplary graph of statistical data in the form of a trigraph of the most used combination of three letters or three letter words in English.
Figure 7E:
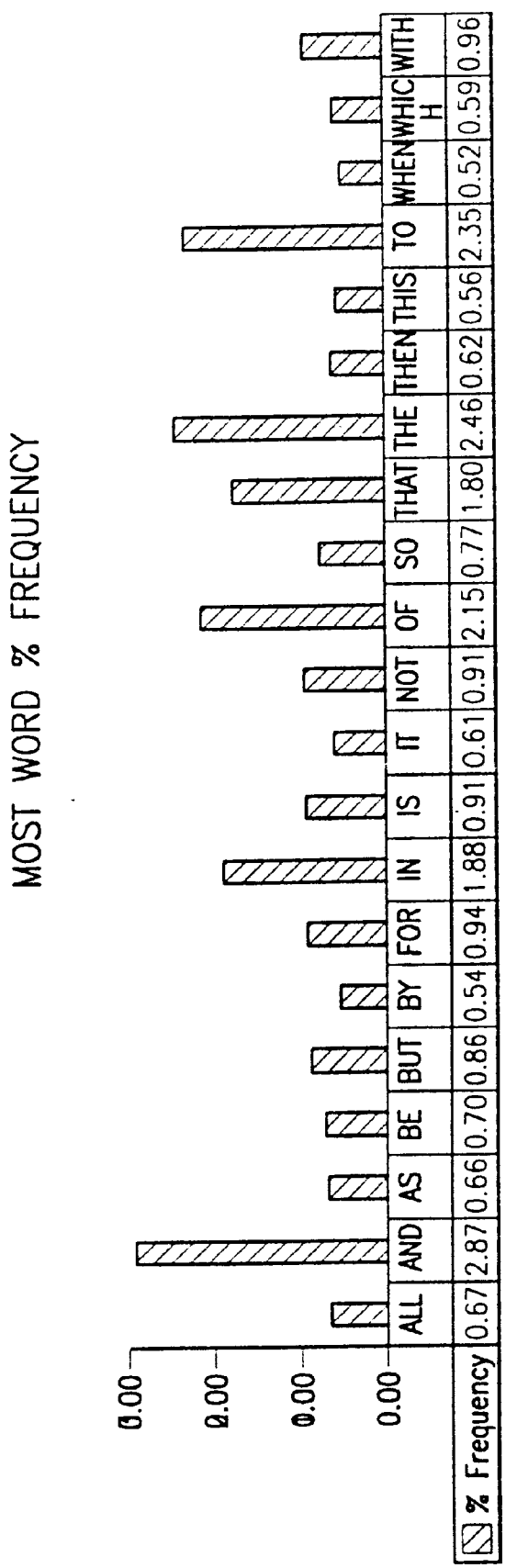
FIG. 7E is an exemplary graph of statistical data of the most used words in English.
Figure 7F:
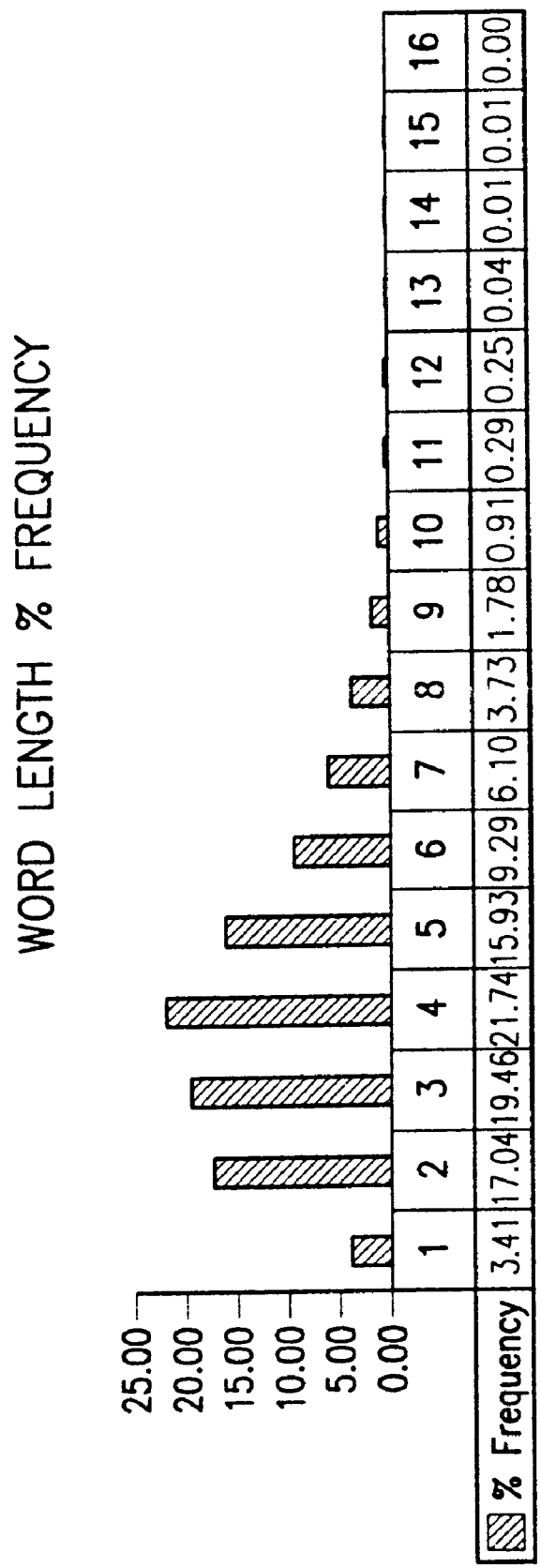
FIG. 7F is an exemplary graph of statistical data of the most used word length in English.
Figure 7G:
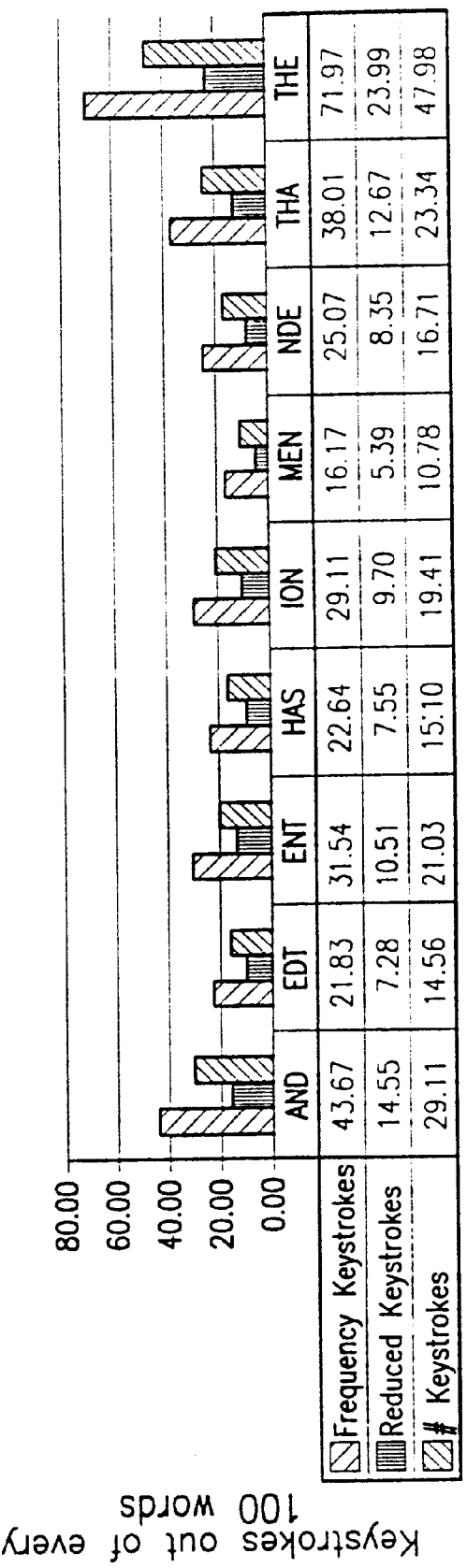
FIG. 7G is an exemplary graph of statistical data of the most common tri-graph combination letters used in English and an associated percentage of keystroke reduction out of a sample of every 100 words.
Figure 7H:
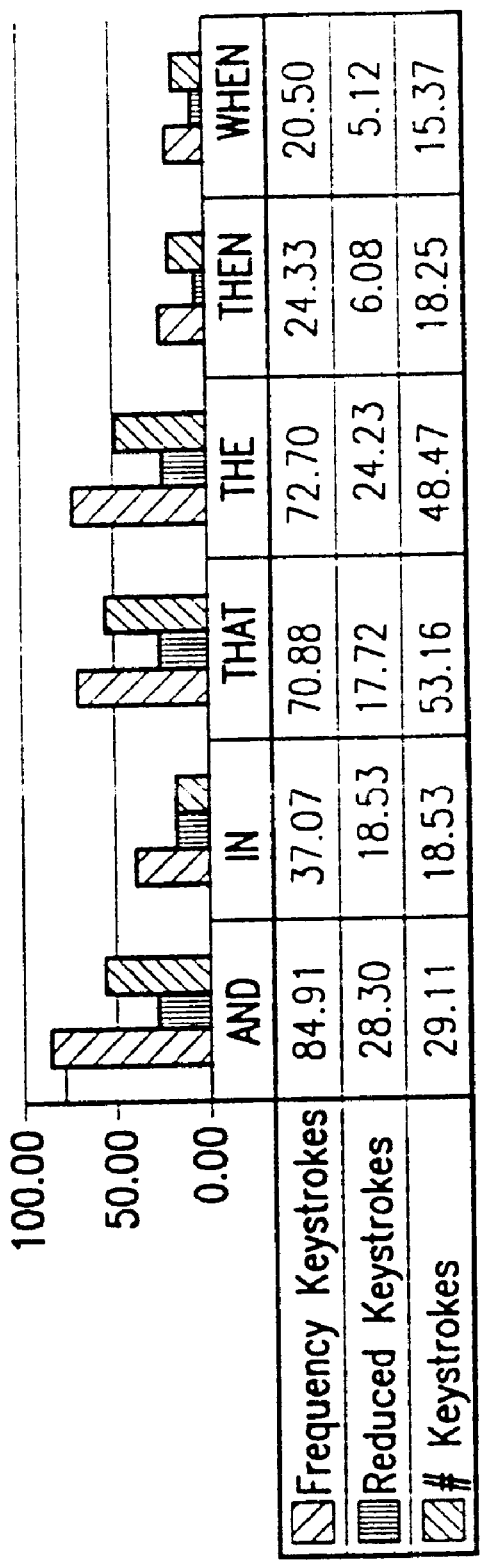
FIG. 7H is an exemplary graph of statistical data of the most commonly used words in a sample of every 100 English words.

A closer look at statistically extrapolated character, word and/or command data or indicia is shown in FIGS. 7–7H. Through the analysis and weight of the most common usages in a particular language such as English, combination or subsets of letters, digraphs, tri-graphs and small words can be extracted. The exclusive union of these categories (frequency,union), filter out duplications of 1 to 3 letters from each respective subset resulting in a compacted optimal mix of combinations that can be used in keyboard design applications to recreate fuller words thereby minimizing repetitive keystrokes and associated injuries. For instance in FIGS. 7–7H, it is shown that the most popular combination of digraph is TH, for tri-graph it is THE and the most used letter is E. The succinct union of these combinations, in turn are process similarly with other unions and the final remaining contents (superset) listed as the most likely candidates that can be use to reduce key strikes or strokes, repetition and key reaches.

As depicted in FIG. 7, a table generated from a variety of studies shows the most common weight of letters and there frequency of use. As shown therein the letter E had the highest frequency as the most used letter in the distribution of data. As depicted in FIG. 7A, the table shows the letter T as having the highest percentage frequency of most used letters that start a word. As depicted in FIG. 7B, the table shows that the letter E as having the highest percentage frequency of the most used letters that start a word in English. In order to generate the most effective union of the selective data, a criteria is imposed to systematically eliminate the less frequent letters and leave only the most popular ones. These in turn, are used in the final selection and optimization of a superset. This can be seen more clearly in the combinations obtained from a digraph depicted in FIG. 7C. Digraphs are combinations of 2 alphabetic letters that are coupled together and occur commonly in words particularly in the English language. The table shown here shows TH, ER, ON, and AN as having the highest percentage frequencies amongst an entire distribution of likely candidates. Similar analysis are performed for more than two letters or tri-graphs depicted in FIG. 7D. Tri-graphs are combinations of 3 alphabetic letters that er grouped together and occur commonly in the English sample set. As shown in the table of FIG. 7D, the three letter word THE is shown as having the highest percentage frequency with AND as next likely candidate for selective combinations. As indicated by the table selecting the most prominent and primary tri-graphs with frequency values greater than 6.10, along with a secondary set with frequency values between 5.00 and 6.10 optimum tri-graph sets can be obtain (eg. primary set: AND, ENT, FOR, ION, THE, TIO; and secondary set: EDT, HAS).

As depicted in FIG. 7E, the table shows the percentage frequency of the most used words of the English language as the sample set wherein words such as AND, IN, OF, THAT, THE, and TO were optimally obtained imposing the criteria of frequency values of greater than 0.9 to obtained the discrete word set. The percentage frequency of words that are 2 or more letters in length strongly indicates that the bulk of keyboard operations requires repetition and multi-strokes. As depicted in FIG. 7F, the recorded data shows a distribution curve which indicates that the main weight in frequency is consumed by words of 2 to 5 letters in length, which represents 74.17% of a possible workload. The introduction of the optimized frequency union from letters, digraphs, tri-graphs and small words significantly reduces this workload by simply eliminating unnecessary typing. Accordingly, this inherently reduces the risks associated with the duration of keyboard operations and subsequently diminishing RSI.

As depicted in FIGS. 7G and 7H, keystroke reduction is shown for the most common tri-graphs and most common words, respectively. The select combination from the frequency union also includes (TO, OR, EN, T, I, ON), (TH, E, AN, D), (ER, IN, G, Y, RE, N, ED) and (QU, Q). For example, the use of the tri-graph AND indicates a keystroke reduction of 14.55 keystrokes out of a sample of 100 words. Using the most common word groups the same word AND indicates a greater keystroke reduction of 28.30 keystrokes out of a sample of 100 words. Other composite key operations can be further defined by the utilization of special function keys as illustrated in FIGS. 8A and 8B below.

As depicted in FIGS. 8A and 8B, outlines of composite key operations are respectively shown to illustrate the MDK system protocol for various key value combinations of a specific set of data utilizing the function keys Normal, Shift, Dual and Dual Shift under Normal and Caps Lock mode. As set forth in FIG. 8A, composite key operations performed are tabulated for exemplary letter (t,T), Symbol (3,#), and Feature (to,TO,www) data key sets. These sets represent the default pair of primary and secondary values, respectively, for their assigned keys in normal typing mode. Note in capitalization mode the primary and secondary feature keys are reversed. The Shift key will work normally as used in existing keyboard operations. The Shift key uses the secondary letter key values. The Dual/Dual Shift keys work only with the secondary or tertiary key values. According to the invention, the pair value for the Q key has been changed and reversed since the letter Q is rarely used singularly and is primarily paired with letter U to form the majority if not all, fixed QU words. Thus, the qu is the primary value, QU the secondary value and q the tertiary value. For the feature key data (to,TO,www) in normal mode, pressing the feature key in normal mode summons "to", pressing the Shift in combination summons "TO", pressing the Dual key in combination with the feature key summons "www" and pressing the Dual Shift key in combination with the feature key summons "WWW" as the normal mode protocol. In caps lock mode, the results for the feature key data set are respectively the reverse.

As set forth in FIG. 8B, an enhanced data set is shown wherein the Letter, Symbol and Feature key data sets include three assigned values in normal mode, respectively (t,T, the), (qu, QU, q) and (to,TO,www). Similarly, function key utilization according to the above reference protocol can be evaluated by using the feature key data (to,TO,www). In normal mode, pressing the feature key in normal mode summons "to", pressing the Shift in combination summons "TO", pressing the Dual key in combination with the feature key summons "www" and pressing the Dual Shift key in combination with the feature key summons "WWW" as the normal mode protocol. In caps lock mode, the results fr the feature key data set are also respectively the reverse.

The primary advantages of the ergonomic keyboard according to both embodiments 8 and 9, includes the aspects of ergonomics which serve to optimize efficient key access by maximizing comfort and minimizing unnecessary keystrokes. Inherent to these particular factors includes comfort by retaining the most neutral body positions and by encouraging minimal body movements. The primary focus being to substantially reduce the likelihood or probability of acquiring injuries or disorders by minimizing stress and fatigue related various parts and muscle groups of the body such as ligaments, musculoskeletal joints, muscle tendons, hand nerves, and neuromuscular trigger points. In this regard, both embodiments 8 and 9 are directed towards merging the needs of able and disabled persons to provide a keyboard which optimize efficient keyboard use and level the keyboard playing field to include an added benefit of diminished RSI.

To this end, it is important to differentiate between the use of a software application and its purpose. The use of the application is defined by the physical operations or functions available via the application interface, keyboard, and pointing device, which help fulfill the purpose of the application. The purpose of an application is its objective to meet user requirements, and to parameterize its use. Mechanisms that enhance the purpose of applications provide diverse or greater methods of application use. This in turn makes the interface, and its keyboard and pointing device, more efficient and effective.

Current keyboards only provide the mechanism to use the applications. The use of the application is determined by the pre-defined user-permitted operations of the applications that allow it to fulfill its purpose. Thus, current keyboards are limited to one-way feeds, from keyboard to application, and do not provide the scope to improve or diversify the application interfaces that would otherwise allow for enhancements to application purpose. For example, in word-processing, all the operations allow one to format and present a document that form the basis of the applications use. The purpose of the application is to enter text, based on language. Thus, the breakdown of language into its bare components, which are letters, digraphs and trigraphs etc., would provide a more efficient and easier mechanism to fulfill the purpose of the application. This also permits the application to diversify its functionality and enhances the versatility of what the application can do with its interface. The same principles can be applied to any soft ware application such as financial trading systems, Internet browsers and the like. The ability of the MDK system to enhance not only application use but also application purpose, via the unique feature keys, improves user interfaces that permit applications to operate more effectively and efficiently with application diversity in Internet related applications.

It is to be understood that the present invention is not limited to the sole embodiments described above, but encompasses any and all embodiments within the scope of the following claims.

I claim:

1. An ergonomic keyboard, comprising:

a keyboard having a plurality of keys with at least one form of functional indicia, said plurality of keys having a substantially central set of keys to form a multi-dexterous keyboard system, wherein said substantially central portion of keys includes a first and second column of keys, and a first and second row of keys for efficiently producing a series of characters, words, and functional commands for subsequent processing;

the central set of keys forms a substantially cross pattern having a plurality of intersecting rows and columns of keys to minimize repetitive stress injuries associated with finger extensions for specific keys operatively positioned beyond a hand span of a user;

the first column of keys comprising a first series of keys with distinct statistically extrapolated indicia of the most used characters and internet commands disposed on each of said first series of keys;

the second column of keys comprising a second series of keys with distinct statistically extrapolated indicia of the most used characters and internet commands disposed on each of said second series of keys;

the first row of keys includes a first series of keys with distinct statistically extrapolated indicia of the most used characters and internet commands disposed on each of said first series of keys; said at least one of said series of keys being arranged substantially perpendicular to at least one of said keys in the first column as at least one ergonomic key in common therewith;

the second row of keys includes a first series of keys with distinct statistically extrapolated indicia of the most used characters and internet commands disposed on each of said second series of keys; said at least one of said series of keys being arranged substantially perpendicular to at least one of said keys in the second column as at least one ergonomic key in common therewith;

whereby said distinct statistically extrapolated indicia comprises at least one of a digraph and a trigraph.

2. The ergonomic keyboard according to claim 1, wherein said keyboard is adapted with a combination auxiliary keypad and calculator module.

3. The ergonomic keyboard according to claim 2, wherein said combination auxiliary keypad and calculator module includes a liquid crystal display (LCD) for displaying various calculations.

4. The ergonomic keyboard according to claim 2, wherein said combination auxiliary module is configured as a Left-Hand-Side (LHS) module.

5. The ergonomic keyboard according to claim 2, wherein said combination auxiliary module is configured as a Right-Hand-Side (RHS) module.

6. The ergonomic keyboard according to claim 1, wherein said statistically extrapolated indicia is selected from a digraph comprising, at least one of TO, OR, EN, T, I, ON, TH, E, AN, D, ER, IN, G, Y, RE, N, ED, QU, and Q.

7. The ergonomic keyboard according to claim 1, wherein said statistically extrapolated indicia is selected from a trigraph comprising, at least one of QUE, QUA, QUI, THE, ETH, ITH, ION, ONE, TEN, ENT, END, ENV, FOR, TOR, TER, FER, GER, BER, INT, INY, REY, REG, GED, EDY, AND, ANY, and ANI.

8. The ergonomic keyboard according to claim 1, wherein said indicia includes at least one functional command of . pro,.name,http,www,.biz,.org,.co.,.gov,.edu,.net,.info,and .com for internet and computer related applications.

* * * * *